(12) United States Patent
Hansen et al.

(10) Patent No.: US 7,375,887 B2
(45) Date of Patent: May 20, 2008

(54) METHOD AND APPARATUS FOR CORRECTING A VISIBLE LIGHT BEAM USING A WIRE-GRID POLARIZER

(75) Inventors: Douglas P. Hansen, Spanish Fork, UT (US); Raymond Perkins, Orem, UT (US); Jim Thorne, Provo, UT (US); Eric Gardner, Provo, UT (US)

(73) Assignee: Moxtek, Inc., Orem, UT (US)

( * ) Notice: Subject to any disclaimer, the term of this patent is extended or adjusted under 35 U.S.C. 154(b) by 155 days.

(21) Appl. No.: 10/997,077

(22) Filed: Nov. 24, 2004

(65) Prior Publication Data

US 2005/0146720 A1 Jul. 7, 2005

Related U.S. Application Data

(63) Continuation-in-part of application No. 10/352,693, filed on Jan. 27, 2003, now abandoned, which is a continuation of application No. 09/819,565, filed on Mar. 27, 2001, now abandoned.

(51) Int. Cl.
*G02B 5/30* (2006.01)

(52) U.S. Cl. ............... 359/486; 359/489; 362/19

(58) Field of Classification Search ........... 359/486, 359/489
See application file for complete search history.

(56) References Cited

U.S. PATENT DOCUMENTS

| | | | |
|---|---|---|---|
| 2,224,214 A | 12/1940 | Brown | |
| 2,287,598 A | 6/1942 | Brown | |
| 2,403,731 A | 7/1946 | MacNeille | |
| 2,748,659 A | 6/1956 | Geffcken et al. | |
| 2,887,566 A | 5/1959 | Marks | |
| 3,046,839 A | 7/1962 | Bird et al. | |
| 3,436,143 A | 4/1969 | Garrett | |

(Continued)

FOREIGN PATENT DOCUMENTS

DE 3707984 A1 3/1987

(Continued)

OTHER PUBLICATIONS

Auton and Hutley, "Grid Polarizers for Use in the Near Infrared," Infrared Physics, 1972, vol. 12, pp. 95-100, Pergamon Press, Great Britain.

(Continued)

*Primary Examiner*—Arnel Lavarias
(74) *Attorney, Agent, or Firm*—Thorpe North & Western

(57) ABSTRACT

An optical system and method for providing a visible light beam with a desired characteristic includes a visible light source producing a visible light beam defining an optical train. An optical element is disposed in the optical train to create a modified beam, and that is capable of introducing an undesired characteristic that continuously transitions across at least a portion of the modified beam. A wire-grid polarizer is disposed in the optical train, and has a plurality of elongated elements with at least a portion that continuously transitions to a different characteristic. The wire-grid polarizer is positioned and oriented in the optical train with the different characteristic corresponding to the undesired characteristic of the modified beam to obtain a visible light beam with a desired characteristic substantially across the visible light beam.

30 Claims, 10 Drawing Sheets

U.S. PATENT DOCUMENTS

| | | | |
|---|---|---|---|
| 3,479,168 A | 11/1969 | Bird et al. |
| 3,536,373 A | 10/1970 | Bird et al. |
| 3,566,099 A | 2/1971 | Makas |
| 3,627,431 A | 12/1971 | Komarniski |
| 3,631,288 A | 12/1971 | Rogers |
| 3,731,986 A | 5/1973 | Fergason |
| 3,857,627 A | 12/1974 | Harsch |
| 3,857,628 A | 12/1974 | Strong |
| 3,876,285 A | 4/1975 | Schwarzmüller |
| 3,912,369 A | 10/1975 | Kashnow |
| 3,969,545 A | 7/1976 | Slocum |
| 4,009,933 A | 3/1977 | Firester |
| 4,025,164 A | 5/1977 | Doriguzzi et al. |
| 4,025,688 A | 5/1977 | Nagy et al. |
| 4,049,944 A | 9/1977 | Garvin et al. |
| 4,073,571 A | 2/1978 | Grinberg et al. |
| 4,104,598 A | 8/1978 | Abrams |
| 4,181,756 A | 1/1980 | Fergason |
| 4,220,705 A | 9/1980 | Sugibuchi et al. |
| 4,221,464 A | 9/1980 | Pedinoff et al. |
| 4,268,127 A | 5/1981 | Oshima et al. |
| 4,289,381 A | 9/1981 | Garvin et al. |
| 4,294,119 A | 10/1981 | Soldner |
| 4,308,079 A | 12/1981 | Venables et al. |
| 4,456,515 A | 6/1984 | Krueger et al. |
| 4,466,704 A | 8/1984 | Schuler et al. |
| 4,492,432 A | 1/1985 | Kaufmann et al. |
| 4,512,638 A | 4/1985 | Sriram et al. |
| 4,514,479 A | 4/1985 | Ferrante |
| 4,515,441 A | 5/1985 | Wentz |
| 4,560,599 A | 12/1985 | Regen |
| 4,679,910 A | 7/1987 | Efron et al. |
| 4,688,897 A | 8/1987 | Grinberg et al. |
| 4,711,530 A | 12/1987 | Nakanowatari et al. |
| 4,743,092 A | 5/1988 | Pistor |
| 4,743,093 A | 5/1988 | Oinen |
| 4,759,611 A | 7/1988 | Downey, Jr. |
| 4,759,612 A | 7/1988 | Nakatsuka et al. |
| 4,799,776 A | 1/1989 | Yamazaki et al. |
| 4,818,076 A | 4/1989 | Heppke et al. |
| 4,840,757 A | 6/1989 | Blenkhorn |
| 4,865,670 A | 9/1989 | Marks |
| 4,870,649 A * | 9/1989 | Bobeck et al. | 372/19 |
| 4,895,769 A | 1/1990 | Land et al. |
| 4,904,060 A | 2/1990 | Grupp |
| 4,913,529 A | 4/1990 | Goldenberg et al. |
| 4,946,231 A | 8/1990 | Pistor |
| 4,966,438 A | 10/1990 | Mouchart et al. |
| 4,991,937 A | 2/1991 | Urino |
| 5,029,988 A | 7/1991 | Urino |
| 5,061,050 A | 10/1991 | Ogura |
| 5,087,985 A | 2/1992 | Kitaura et al. |
| 5,113,285 A | 5/1992 | Franklin et al. |
| 5,122,887 A | 6/1992 | Mathewson |
| 5,122,907 A | 6/1992 | Slocum |
| 5,139,340 A | 8/1992 | Okumura |
| 5,157,526 A | 10/1992 | Kondo et al. |
| 5,177,635 A | 1/1993 | Keilmann |
| 5,204,765 A | 4/1993 | Mitsui et al. |
| 5,216,539 A | 6/1993 | Boher et al. |
| 5,225,920 A | 7/1993 | Kasazumi et al. |
| 5,235,443 A | 8/1993 | Barnik et al. |
| 5,235,449 A | 8/1993 | Imazeki et al. |
| 5,239,322 A | 8/1993 | Takanashi et al. |
| 5,245,471 A | 9/1993 | Iwatsuka et al. |
| 5,279,689 A | 1/1994 | Shvartsman |
| 5,295,009 A | 3/1994 | Barnik et al. |
| 5,305,143 A | 4/1994 | Taga et al. |
| 5,325,218 A | 6/1994 | Willett et al. |
| 5,333,072 A | 7/1994 | Willett |
| 5,349,192 A | 9/1994 | Mackay |
| 5,357,370 A | 10/1994 | Miyatake et al. |
| 5,383,053 A | 1/1995 | Hegg et al. |
| 5,422,756 A | 6/1995 | Weber |
| 5,436,761 A | 7/1995 | Kamon |
| 5,466,319 A | 11/1995 | Zager et al. |
| 5,485,499 A | 1/1996 | Pew et al. |
| 5,486,935 A | 1/1996 | Kalmanash |
| 5,486,949 A | 1/1996 | Schrenk et al. |
| 5,490,003 A | 2/1996 | Van Sprang |
| 5,506,704 A | 4/1996 | Broer et al. |
| 5,508,830 A | 4/1996 | Imoto et al. |
| 5,513,023 A | 4/1996 | Fritz et al. |
| 5,513,035 A | 4/1996 | Miyatake et al. |
| 5,517,356 A | 5/1996 | Araujo et al. |
| 5,557,343 A | 9/1996 | Yamagishi |
| 5,559,634 A | 9/1996 | Weber |
| 5,570,215 A | 10/1996 | Omae et al. |
| 5,574,580 A | 11/1996 | Ansley |
| 5,579,138 A | 11/1996 | Sannohe et al. |
| 5,594,561 A | 1/1997 | Blanchard |
| 5,609,939 A | 3/1997 | Petersen et al. |
| 5,612,820 A | 3/1997 | Schrenk et al. |
| 5,619,356 A | 4/1997 | Kozo et al. |
| 5,626,408 A | 5/1997 | Heynderickx et al. |
| 5,658,060 A | 8/1997 | Dove |
| 5,686,979 A | 11/1997 | Weber et al. |
| 5,731,246 A | 3/1998 | Bakeman, Jr. et al. |
| 5,748,368 A | 5/1998 | Tamada et al. |
| 5,748,369 A | 5/1998 | Yokota |
| 5,798,819 A | 8/1998 | Hattori et al. |
| 5,826,960 A | 10/1998 | Gotoh et al. |
| 5,833,360 A | 11/1998 | Knox et al. |
| 5,838,403 A | 11/1998 | Jannson et al. |
| 5,841,494 A | 11/1998 | Hall |
| 5,986,730 A | 11/1999 | Hansen et al. |
| 5,991,075 A | 11/1999 | Katsuragawa |
| 6,075,235 A | 6/2000 | Chun |
| 6,081,376 A | 6/2000 | Hansen et al. |
| 6,082,861 A | 7/2000 | Dove et al. |
| 6,096,155 A | 8/2000 | Harden et al. |
| 6,108,131 A | 8/2000 | Hansen et al. |
| 6,122,103 A | 9/2000 | Perkins et al. |
| 6,234,634 B1 | 5/2001 | Hansen et al. |
| 6,250,762 B1 | 6/2001 | Kuijper |
| 6,288,840 B1 | 9/2001 | Perkins et al. |
| 6,310,345 B1 | 10/2001 | Pittman et al. |
| 6,340,230 B1 | 1/2002 | Bryars et al. |
| 6,585,378 B2 | 7/2003 | Kurtz et al. |
| 6,666,556 B2 | 12/2003 | Hansen et al. |
| 6,739,723 B1 * | 5/2004 | Haven et al. | 353/20 |
| 6,785,050 B2 | 8/2004 | Lines et al. |
| 2002/0122235 A1 | 9/2002 | Kurtz et al. |
| 2002/0191286 A1 | 12/2002 | Gale et al. |
| 2003/0117708 A1 | 6/2003 | Kane |
| 2003/0180024 A1 | 9/2003 | Edlinger |
| 2006/0192960 A1 * | 8/2006 | Rencs et al. | 356/364 |

FOREIGN PATENT DOCUMENTS

| | | |
|---|---|---|
| EP | 0317910 A1 | 11/1987 |
| EP | 0349144 B1 | 6/1988 |
| EP | 0349309 B1 | 6/1988 |
| EP | 0336334 A2 | 8/1988 |
| EP | 0357946 B1 | 8/1988 |
| EP | 0407830 A2 | 7/1989 |
| EP | 0416157 | 9/1989 |
| EP | 0488544 A1 | 11/1990 |
| EP | 0507445 A2 | 3/1991 |
| EP | 0518111 A1 | 5/1991 |
| EP | 0588937 B1 | 6/1991 |
| EP | 0521591 B1 | 7/1991 |
| EP | 0543061 A1 | 11/1991 |
| EP | 0606940 A2 | 1/1993 |

| | | |
|---|---|---|
| EP | 0634674 A2 | 6/1993 |
| EP | 0670506 A1 | 9/1993 |
| EP | 566 004 | 10/1993 |
| EP | 0744634 A2 | 5/1995 |
| JP | 4-12241 | 1/1992 |
| JP | 10-073722 | 3/1998 |
| SU | 1781659 A1 | 10/1990 |
| WO | WO 02/077588 | 10/2002 |

OTHER PUBLICATIONS

Auton, "Infrared Transmission Polarizers by Photolithography,"Applied Optics Jun. 1967 vol. 6, No. 6, pp. 1023-1027.

Bird and Parrish, Jr., "The Wire Grid as a Near-Infrared Polarizer," J. Op. Soc. Am. vol. 50 No. 9 (1960) pp. 886-891.

Dainty, et al, "Measurements of light scattering by a characterized random rough surface", Waves in Random Media 3 (1991) S29-S39, Printed in the United Kingdom.

DeSanto & Wombell, "Rough surface scattering", Waves in Random Media 1 (1991).

Enger and Case, "Optical elements with ultrahigh spatial-frequency surface corrugations," Applied Optics Oct. 15, 1983, vol. 22, No. 20 pp. 3220-3228, S41-S56, Printed in the United Kingdom.

Flanders, Application of $\chi$ 100 Å linewidth structures fabricated by shadowing techniques$^a$ ), J. Vac. Sci. Technol., 19(4), Nov./Dec. 1981 pp. 892-896.

Flanders, "Submicronmeter periodicity gratings as artificial anisotropic dielectrics," Appl. Phys. Lett. 42 (6), Mar. 15, 1983, pp. 492-494.

Glytsis and Gaylord, "High-spatial-frequency binary and multilevel stairstep gratings: polarization-selective mirrors and broadband antireflection surfaces," Applied Optics Aug. 1, 1992 vol. 31, No. 22 pp. 4459-4470.

Haggans et al., "Lamellar gratings as polarization components for specularly reflected beams," Journal of Modern Optics, 1993, vol. 40, No. 4, pp. 675-686.

Handbook of Optics vol. II, 2nd Edition, pp. 3.32-3.35.

Handbook of Optics, 1978, pp. 10-68-10-77.

Hass and O'Hara, "Sheet Infrared Transmission Polarizers," Applied Optics Aug. 1965, vol. 4, No. 8 pp. 1027-1031.

Knop, "Reflection Grating Polarizer for the Infrared," Optics Communications vol. 26, No. 3, Sep. 1978, pp. 281-283.

Kuta and van Driel, "Coupled-wave analysis of lamellar metal transmission gratings for the visible and the infrared," J. Opt. Soc. Am. A/vol. 12, No. 5/May 1995 pp. 1118-1127.

Lavin, "Specular Reflection", Monographs on App. Opt. No. 2 pp. 26-35.

Li Li and J.A. Dobrowski, "Visible broadband, wide-angle, thin-film multilayer polarizing beam splitter," Applied Optics May 1, 1996, vol. 35, No. 13, pp. 2221-2224.

Lloyd William Taylor Manual of Advanced Undergraduate Experiments in Physics, p. 302 (1959) Electricity and Magnetism, Addison-Wesley Publishing Company 1961.

Lockbihler and Depine, "Diffraction from highly conducting wire gratings of arbitrary cross-section," Journal of Modern Optics, 1993, vol. 40, No. 7, pp. 1273-1298.

Maystre & Dainty, Modern Analysis of Scattering Phenomena Proceeding from International Workshop held at Domaine deTournon, Aix en Provence, France Sep. 5-8, 1990.

N.M. Ceglio, Invited Review "Revolution in X-Ray Optics", J. X-Ray Science & Tech. 1, 7-78 (1989) pp. 8-78.

Nordin et al., "Micropolarizer array for infrared imaging polarimetry", J. Op. Soc. Am. A. vol. 16 No. 5/May 1999, pp. 1168-1174.

Novak et al., "Far infrared polarizing grids for use at cryogenic temperatures," Applied Optics, Aug. 15, 1989/vol. 28, No. 15, pp. 3425-3427.

Optics 9th Edition, © M. H. Freeman and B.L. Hasler "Linear polarization by anisotrophy-crystals and grids" pp. 338-339 (1980).

Sonek et al., "Ultraviolet grating polarizers," J. Vac. Sci. Technol., 19(4), Nov./Dec. 1981, pp. 921-923.

Stenkamp et al, "Grid polarizer for the visible spectral region," SPIE vol. 2213 pp. 288-296.

Whitbourn and Douglas, "Phase shifts in transmission line models of thin periodic metal grids," Applied Optics Aug. 15, 1989 vol. 28, No. 15, pp. 3511-3515.

Zanzucchi and Thomas "Corrosion Inhibitors for Aluminum Films" David Sarnoff Research Center Princeton, New Jersey pp. 1370-1375.

Moshier et al. "The corrosion and passivity of aluminum exposed to dilute sodium sulfate solutions" Corrosion Science vol. 27, No. 8 pp. 785-801, 1987.

Scandurra et al. "Corrosion inhibitors of Al metal in microelectronic devices assembled in plastic packages" Journal of Electrochemical Society B289-B292 (2001).

* cited by examiner

METHOD AND APPARATUS FOR CORRECTING A VISIBLE LIGHT BEAM USING A WIRE-GRID POLARIZER

PRIORITY CLAIM

This is a continuation-in-part of U.S. patent application Ser. No. 10/352,693, filed Jan. 27, 2003 now abandoned, which is a continuation of Ser. No. 09/819,565, filed Mar. 27, 2001, now abandon.

BACKGROUND

1. Field of the Invention

The present invention relates generally to wire-grid polarizers in the visible spectrum to correct a visible light beam or compensate for another optical element.

2. Related Art

When certain optical elements are exposed to plane polarized light, they cause changes in the polarization state. Short of complete depolarization, they can rotate the plane of polarization, induce some ellipticity in to the beam, or both. Such changes can occur uniformly over the beam of light, or it may only occur in certain portions of the beam. In any case, the resulting beam cannot be effectively extinguished by another linear polarizer which may be required in the optical train (e.g. to generate image contrast in a liquid crystal projection display). One solution is to put a "clean up" polarizer behind the element to reject light of the wrong polarization. Unfortunately, this dims portions of the transmitted light beam and may not be sufficient to restore sufficient contrast across the entire beam of light. The reduction of intensity, and especially the inhomogeneity of intensity and/or contrast across the beam is objectionable in many applications, and especially in imaging systems.

As an example, consider a spherical lens that is not dichroic or birefringent. Such a lens rotates polarized light by the following mechanism. The ray along the axis of the lens is un-deviated in its path, and completely maintains its polarization. Other rays will have their path changed by the action of the lens, causing a rotation of some degree in the polarization orientation of this ray. As a result, the light exiting the lens will have some rays which have maintained their polarization orientation, and other rays with rotated polarization orientations. It would be desirable to correct these polarization aberrations.

There are several types of polarizers:

Birefringent crystal prism polarizers are typically as long as they are wide (approximately cubic). They are made of polished, carefully oriented crystal prisms. As a result, they are expensive, and will polarize light only if it has very low divergence or convergence.

The MacNielle cube polarizer is not made of birefringent materials, but it is similar to crystal polarizers in many respects. For both of these, thickness, low acceptance angle and cost prohibit their effective use.

Thinner polarizers can be made of oriented, treated polymer sheets. Although they transmit most of the light of one polarization, they typically absorb virtually all of the light of the orthogonal polarization. This can lead to severe heating in intense light, and the polymers typically degrade at temperatures less than 200 degrees C. Because the absorbing particles are dispersed in the polymer, a certain thickness (approximately 0.05 mm) is required for adequate absorption of the unwanted polarization. In addition, the polymer material is not very stable in environments where temperature and humidity change frequently.

It has been proposed to make a more heat-resistant polarizer by orienting prolate metal spheroids embedded in glass provided the spheroids have dimensions that are small compared to the light to be polarized. Unfortunately, such polarizers can be difficult to produce. For example, see U.S. Pat. No. 5,122,907.

Another type of polymer based polarizer contains no absorbers, but separates the two polarizations with tilted regions of contrasting refractive indexes. The light enters from the open side of the V-shaped film, is reflected from one side to the other, and then out. For this retro-reflecting polarizer to work, both sides of the "V" must be present. They are of moderate thickness, do not resist high temperatures, and have limited angular aperture. Again, such polarizers are not easily produced. For example, see U.S. Pat. No. 5,422,765.

A heat-resistant polarizer can be made of inorganic materials of differing refractive index. Such polarizers can be thin (about 0.1-10.0 μm) because they are inhomogeneous films deposited at an angle on a substrate which may be thin. Unfortunately, there is considerable randomness to the placement of the transparent oxide columns that are deposited to provide the anisotropic structure for the polarizer. The randomness limits performance, so transmission is only about 40%, and the polarization is only about 70%. This optical performance is inadequate for most applications. For example, see U.S. Pat. No. 5,305,143.

Another evaporated thin film polarizer also is inefficient because of randomness. This type of polarizer is made by oblique evaporation of two materials, at least one of which is birefringent. For example, see U.S. Pat. No. 5,245,471.

Many of the above polarizers either absorb the orthogonal polarization, or reflect it in directions where it is difficult to use.

SUMMARY OF THE INVENTION

It has been recognized that it would be advantageous to develop a method and/or apparatus to correct a visible light beam and/or compensate for an undesirable characteristic introduced into the light beam by another optical element. It has been recognized that it would be advantageous to develop a polarizer device capable of polarizing visible light. In addition, it has been recognized that it would be advantageous to develop such a polarizer device capable of treating or affecting a visible light beam such that the resulting transmitted and/or reflected beams have a controlled or patterned polarization orientation therethrough, with the control or pattern depending on the application. In addition, it has been recognized that it would be advantageous to develop such a polarizer device which treats or affects different portions of the light beam differently, such that the resulting transmitted and/or reflected beams have portions with different polarization orientations, which can be used to compensate for other optical elements, or for other applications.

The invention provides a method for obtaining a light beam, such as a visible light beam, with a desired characteristic. The light beam is modified with an optical element to obtain a modified beam with an optical element that is capable of introducing an undesired characteristic that continuously transitions across at least a portion of the modified beam. The undesired characteristic of the modified beam is compensated for by a wire-grid polarizer having a plurality of elongated elements. At least a portion of the elongated elements continuously transitions to a different characteristic corresponding to the undesired characteristic of the modified beam to obtain a light beam with a desired characteristic substantially across the light beam.

In accordance with a more detailed aspect of the present invention, the undesired characteristic of the modified beam is an undesirable, continuous transition in polarization state. The elongated elements obtain a light beam with a substantially uniform polarization state.

In addition, the invention provides an optical system to provide a light beam with a desired characteristic. A light source produces a visible light beam defining an optical train. An optical element is disposed in the optical train to create a modified beam. In addition, the optical element is capable of introducing an undesired characteristic that continuously transitions across at least a portion of the modified beam. A wire-grid polarizer is disposed in the optical train. The wire-grid polarizer has a plurality of elongated elements with at least a portion that continuously transitions to a different characteristic. The wire-grid polarizer is positioned and oriented in the optical train with the different characteristic corresponding to the undesired characteristic of the modified beam to obtain a light beam with a desired characteristic substantially across the light beam.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

Figure 5:
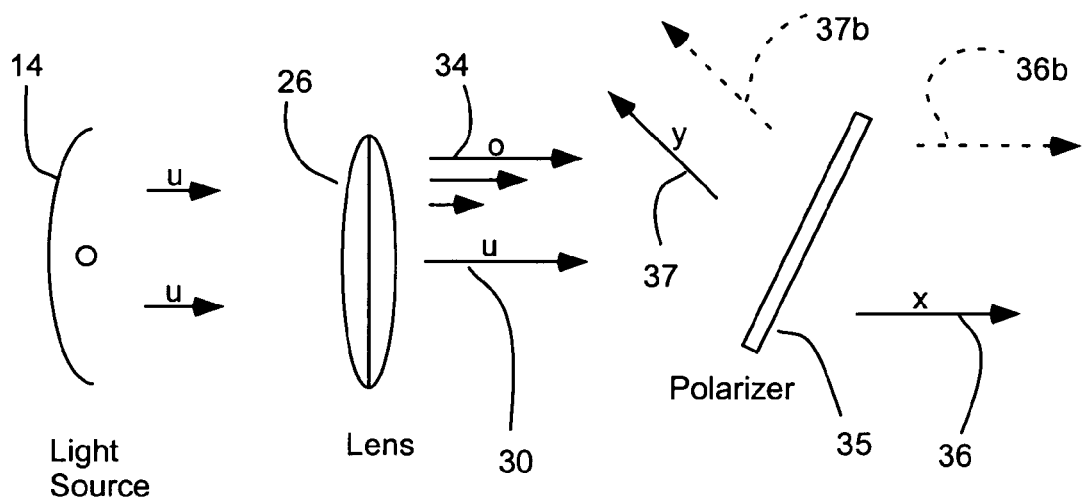
FIGS. 5 and 6 are side schematic views of optical trains illustrating optical elements introducing undesirable characteristics into the light beams.
Figure 6:
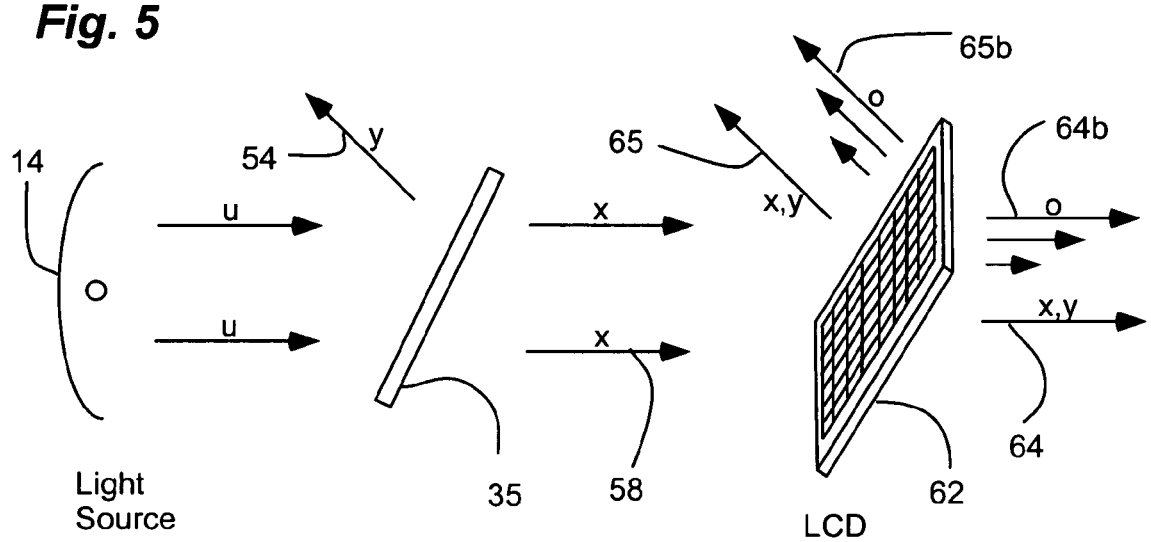

The present invention provides a method and a wire-grid polarizer for correcting or compensating for an undesirable characteristic introduced by an optic element. The undesirable characteristic can be a change in polarization state. For example, the optical element can be a lens that introduces an elliptical polarization orientation or otherwise rotates a linear polarization of a light beam, as shown in FIG. 5. As another example, the optical element can be a reflective liquid crystal array, as shown in FIG. 6. In both cases, the beam can be polarized, such as by a wire-grid polarizer with straight, elongated elements of constant thickness, width, pitch and orientation.

The present invention provides wire-grid polarizers which have been fabricated in such a way as to possess characteristics that change in a controlled manner across the optical aperture of the polarizer. The characteristics that may be changed in a controlled manner include, but are not limited to, polarization contrast, transmission, and polarization orientation. Such a wire-grid polarizer can be designed to largely correct the aberrations in the polarization state that are caused by another component in the optical system, such as a lens. Therefore, the system is able to realize performance advantages over systems that use other approaches to correct for polarization aberrations, such as clean-up polarizers.

As illustrated in FIGS. 1-4, exemplary methods and optical trains, or optical systems, are shown in accordance with the present invention. The optical trains or systems can be, or can form portions of, various optical systems, such as image projection systems. As illustrated in FIGS. 7-14b, exemplary wire-grid polarizers are shown in accordance with the present invention with configurations to correct or compensate for an undesirable characteristic, such as a change in polarization state, introduced by an optical element. As described in greater detail below, the wire-grid polarizers of the present invention incorporate a continuous change in the elements across at least a portion of the optical aperture of the polarizer in order to continuously change a characteristic or polarization state of the light beam. For example, the continuous change in the elements can include changes in orientation (angled or curved elements), thickness, width, pitch, etc. Thus, the wire-grid polarizer of the present invention can affect the light beam differently at different locations throughout the light beam, and can produce a light beam with a continuous change in polarization state across at least a portion of the beam. For example, the wire-grid polarizer can be configured to both 1) produce a light beam with a more uniform polarization state across at least a portion of the light beam, or 2) produce a light beam with a continuous change in polarization state across at least a portion of the light beam, to achieve a desired light beam or to correct a light beam.

Figure 1:
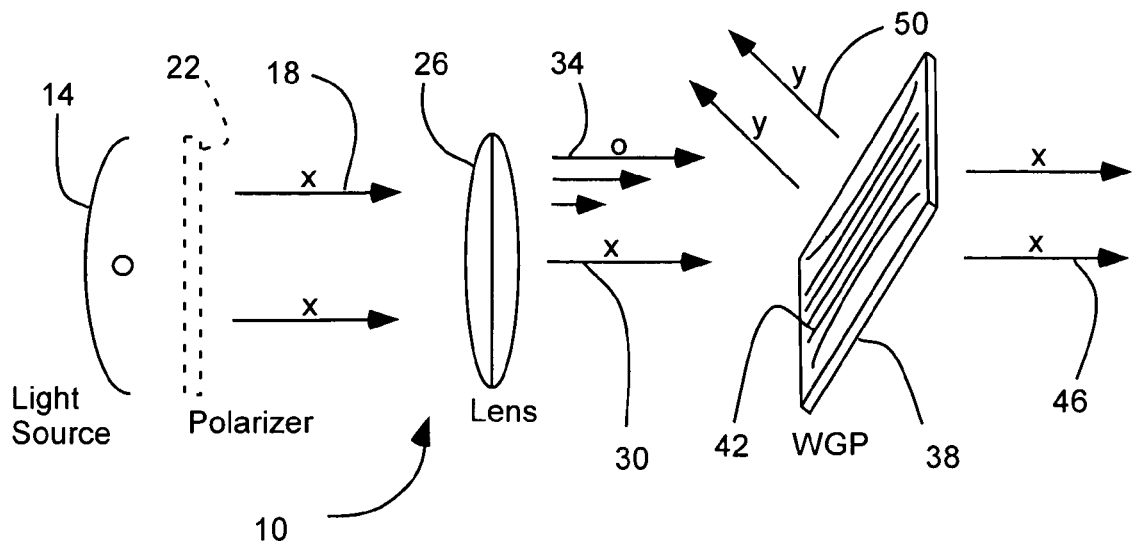
FIG. 1 is a side schematic view of an optical train with a wire-grid polarizer compensating for an undesirable characteristic introduced by an optical element in accordance with an embodiment of the present invention with the wire-grid polarizer disposed in a beam transmitted through the optical element and providing a compensated beam either reflected from or transmitted through the wire grid polarizer.
Figure 2:
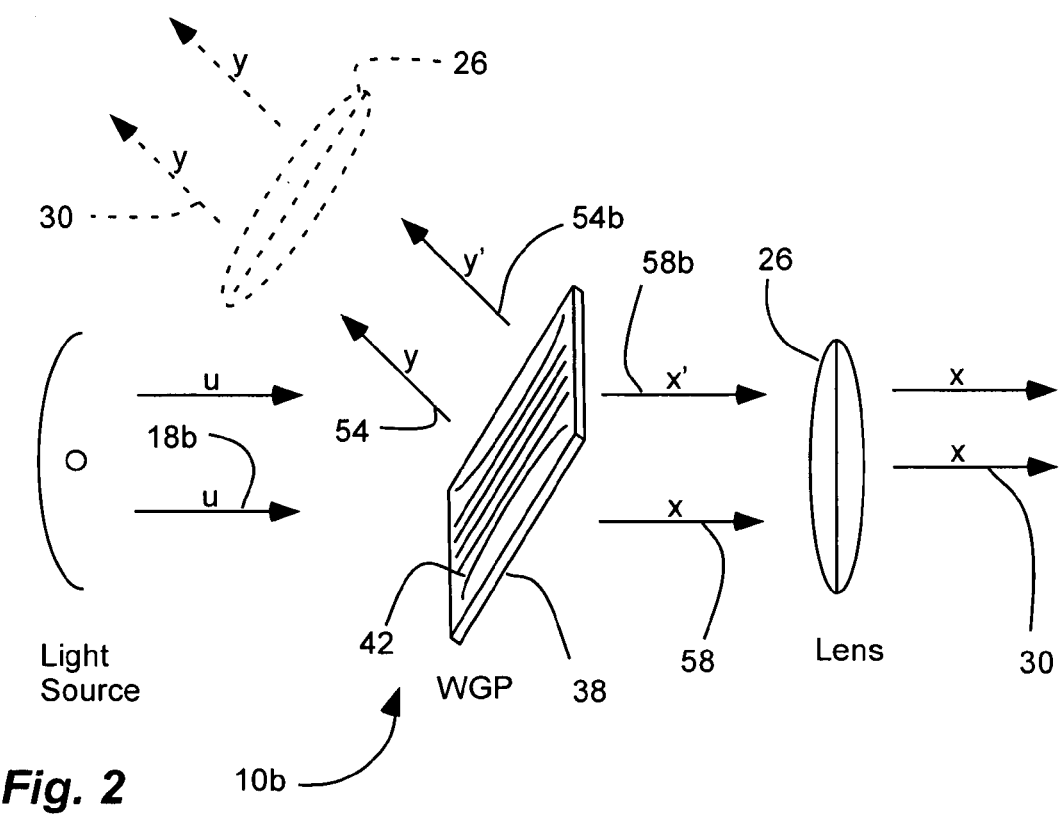
FIG. 2 is a side schematic view of another optical train with a wire-grid polarizer compensating for an optical element capable of introducing an undesirable characteristic in accordance with an embodiment of the present invention with the wire-grid polarizer disposed prior to the optical element and providing a compensating beam either reflected from or transmitted through the wire grid polarizer and the optical element disposed in either the reflected or transmitted beam.
Figure 3:
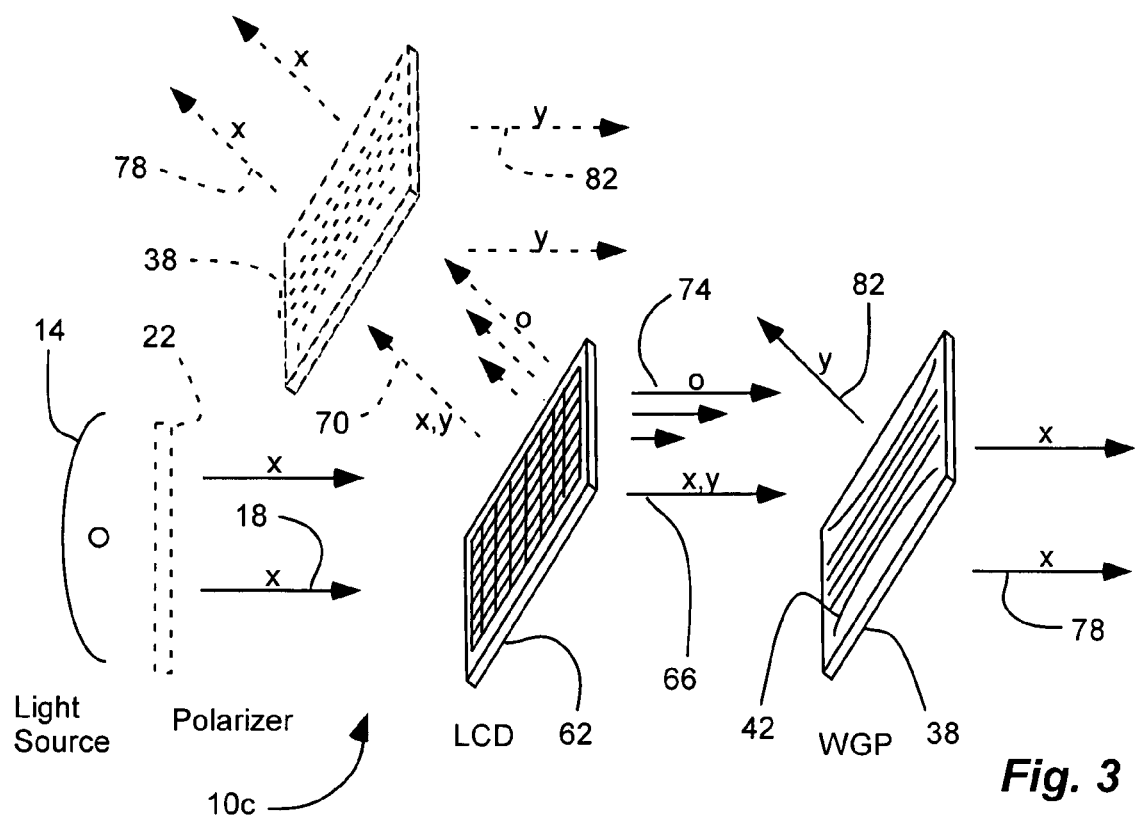
FIG. 3 is a side schematic view of another optical train with a wire-grid polarizer compensating for an undesirable characteristic introduced by an optical element in accordance with an embodiment of the present invention with the wire-grid polarizer disposed in a beam reflected from or transmitted through the optical element and providing a compensated beam either reflected from or transmitted through the wire grid polarizer.
Figure 4:
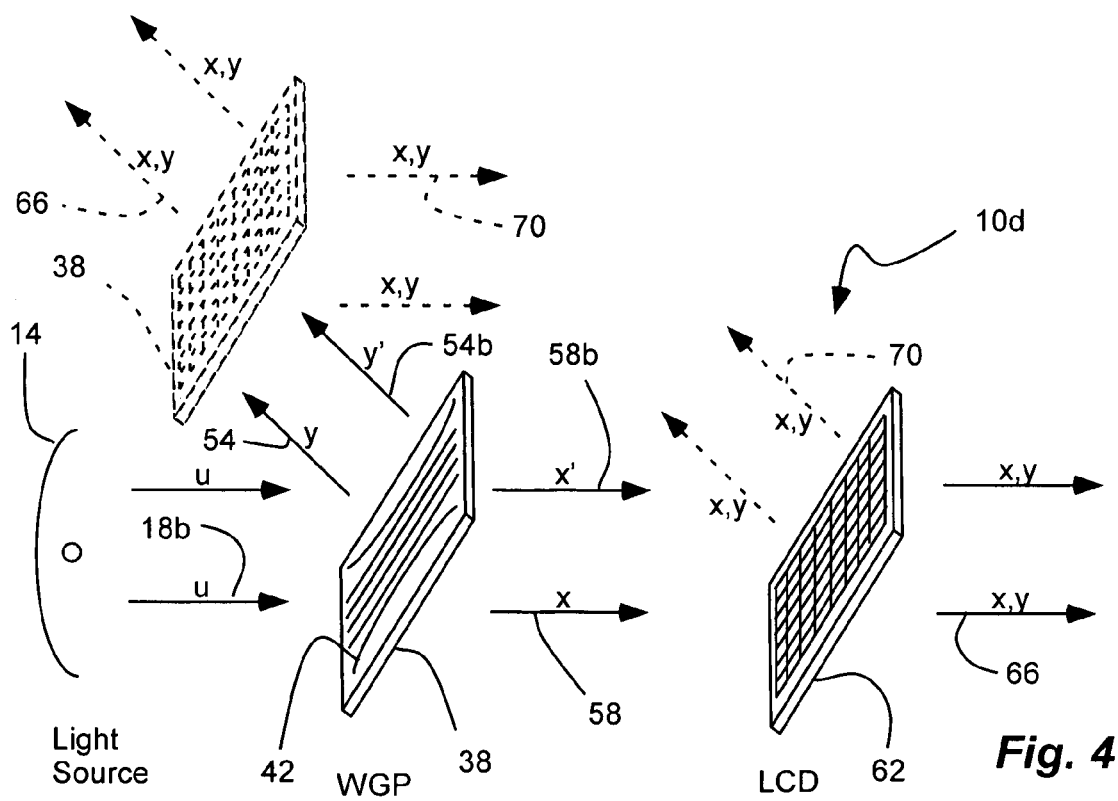
FIG. 4 is a side schematic view of another optical train with a wire-grid polarizer compensating for an optical element capable of introducing an undesirable characteristic in accordance with an embodiment of the present invention with the wire-grid polarizer disposed prior to the optical element and providing a compensating beam either reflected from or transmitted through the wire grid polarizer and the optical element disposed in either the reflected or transmitted beam.

The undesirable characteristic can be introduced into the beam and subsequently corrected or compensated for by a wire-grid polarizer disposed subsequent to the optical element, as shown in FIGS. 1 and 3. In addition, the optical element can be capable of introducing an undesirable characteristic into the light beam, but corrected or compensated for by a wire-grid polarizer disposed prior to the optical element, as shown in FIGS. 2 and 4.

The optical element can introduce, or be capable of introducing, the undesirable characteristic by transmitting the beam therethrough, as shown in FIGS. 1 and 2. Examples of optical elements that transmit include lenses, transmissive liquid crystal arrays, an optical retarder, a waveplate, a prism, a transmissive substrate, transmissive polarizers, etc. In addition, the optical element can introduce, or be capable of introducing, the undesirable characteristic by reflecting the beam therefrom, as shown in FIGS. 3 and 4. Examples of optic elements that reflect include mirrors, reflective liquid crystal arrays, etc.

Referring to FIG. 1, an optical train 10, or optical system, and method are shown for obtaining a visible light beam with a desired characteristic, and/or for correcting or compensation an undesired optical effect applied by an optical element. As stated above, the desired characteristic can be a more uniform polarization state, such as a substantially uniform and continuous linear polarization state across the light beam. Similarly, the undesired optical effect can be the introduction of a different linear polarization state, or a rotation of the desired polarization state.

The optical train 10 can be defined by the path(s) of light and the optical components disposed in, directing, and affecting the path of light. For example, the optical train can form at least a portion of a projection display or the like. The optical train 10 includes a light source 14 providing a visible light beam, indicated by lines 18. The light source 14 can be a high intensity discharge lamp, light emitting diode (LED), either as a single element or an array of LEDs, a high pressure mercury arc lamp, a plasma light source, etc. The visible light beam 18 has a wavelength(s) in the visible spectrum, or between approximately 400-700 nm (nanometers), or 0.4-0.7 µm (micrometers). Alternatively, the light beam may have a wavelength in other regions, such as the ultra-violet (from 190 nm to 420 nm, or the infrared, from 700 nm to 10,000 nm, for example.

The optical train can include other optical components to collimate, shape, focus, direct or otherwise treat the visible light beam 18. For example, a polarizer 22 can be disposed in the visible light beam 18 to polarize the beam, or restrict the visible light beam to substantially a single polarization state, indicated by x. (The polarization state of the visible light beam can be composed of two opposite or orthogonal polarization states, indicated as x and y throughout. Polarization states are typically designated by s and p, but x and y are used herein with x designating either s or p, and y designating the other polarization state.) The polarizer 22 can include one or more polarizers, and the polarizers can be any type of polarizer, including a wire-grid polarizer, dichroic polarizer, thin film polarizer, etc. Alternatively, the visible light beam can be unpolarized, indicated by u (FIG. 2).

As another example, the optical train 10 can include an optical element 26 disposed in the visible light beam 18. The optical element 26 may provide a desired function, or may substantially modify the visible light beam in a desired fashion. For example, the optical element 26 may collimate, shape, focus, direct or otherwise treat the visible light beam to obtain a desired result. As such, the optical element 26 can be a lens (as shown), a plurality of lenses, a transmissive liquid crystal array(s), an optical retarder(s), a waveplate(s), a prism(s), a transmissive substrate(s), a transmissive polarizer(s), etc. The lens can be plano-convex, piano concave, convex-convex, convex-piano, concave-piano, etc. The optical element 26 can be configured to transmit the visible light beam therethrough to produce a modified beam, indicated by lines 30. The modified beam 30 may substantially include desired characteristics, such as the desired polarization state. In addition, the modified beam may be modified by the optical element 26 to be focused, collimated, etc.

In addition, the optical element 26 can undesirably modify the visible light beam 18, or a portion thereof, to obtain an undesirable modified beam, indicated by lines 34, with an undesired characteristic. For example, the undesirable modified beam 34 can include an undesired rotated or elliptical polarization, indicated by o. (Alternatively, the optical element can be capable of introducing the undesired characteristic, as described below.) The undesired characteristic can continuously transition across at least a portion of the modified beam 30, indicated by the variable length of the lines 34. For example, the optical element 26 may introduce an undesired rotated or elliptical polarization state o that transitions from lesser to greater, or increases in magnitude, across a cross-section of the beam. The above described scenario can be realized by a lens that can introduce a continuous transition in the polarization state.

The optical element 26 can have a characteristic that is undesirable in some aspect. For example, the optical element 26 or lens can have a curvature or varying thickness that can introduce the undesirable characteristic, such as the change in polarization state. It will be appreciated that the characteristic in the optic element can be both desirable and undesirable. For example, the curvature or varying thickness of a lens is desirable with respect to focusing the light beam, but undesirable with respect to changing the polarization state.

It will be appreciated that the undesired characteristic, or undesired change in polarization state, may adversely affect the performance of the optical train, causing other optical components to treat the light beam differently than intended. For example, if the optical train forms part of a projection display or the like with a liquid crystal array or polarization analyzer, the undesired characteristic or change in polarization state may cause image information on the beam to be mis-rotated by the liquid crystal array, or mis-rejected or mis-allowed by the polarization analyzer, resulting in a distorted or incorrect image. An example is represented in FIG. 5 in which a typical polarizer 35, such as a wire-grid polarizer with straight and constant elements, is disposed in the modified beam 30 subsequent to the optical element 26. The intended purpose of the polarizer 35 can be to polarize the modified beam 30, or separate the modified beam 30 into separate polarization states x and y. For example, the polarizer 35 can be intended to transmit a transmitted beam 36 of one polarization state x and reflect a reflected beam 37 of the opposite polarization state y. Because the optical element 26 has introduced an undesirable characteristic o into a portion of the beam 34, however, the intended purpose of the polarizer 35 is not fully realized. For example, the portion of the beam 34 with the undesirable characteristic o may be untreated or mistreated by the polarizer 35, indicated by dashed lines 36b and 37b. For example, the dashed lines 36b and 37b represent portions of the beam that may be unintentionally eliminated, unintentionally transmitted, unintentionally reflected, or that now have an undesired polarization state, etc.

Therefore, referring again to FIG. 1, a wire-grid polarizer 38 in accordance with the present invention, mentioned above and described more fully below, can be disposed in the optical train, or in the modified beam 30 subsequent to the optical element 26 to compensate for the undesired characteristic, or the undesired change in polarization state, of the modified beam 30. As described in greater detail below, the wire-grid polarizer 38 has a plurality of elongated elements 42 with at least a portion that continuously transitions across an optical aperture of the polarizer to a different characteristic corresponding to the undesired characteristic of the modified beam. Thus, the wire-grid polarizer 38, or continuous transition of elements 42, obtains a desired visible light beam 46 or 50 with a desired characteristic substantially across the visible light beam. As described below, the wire-grid polarizer 38 can substantially separate the modified light beam 30 into opposite or orthogonal polarization states x and y, and can be configured to transmit the desired beam 46 and/or reflect the desired beam 50.

The continuous transition to a different characteristic of the elements 42 of the wire-grid polarizer 38 can include a change to a different angular orientation, a different period, a different width, a different thickness, a different shape, and/or a curvature or different curvature. Several characteristics may be changed together in a coordinated manner or only one characteristic may be changed. All or only some of the elements may transition. In addition, only a portion of the element may transition. By way of example, some of the elements 42 of the wire-grid polarizer 38 are shown in FIG. 1 as transitioning to a curvature or different angular orientation. The continuous transition in character of the elements 42 of the wire-grid polarizer 38 can correspond to the continuous transition in the undesired characteristic, or continuous transition in undesired polarization, of the modified beam 30. Or the continuous transition in character of the elements 42 of the wire-grid polarizer 38 can correspond to the undesirable characteristic of the optical element 26. Thus, the wire-grid polarizer 38 can be positioned and/or oriented to correspond to the modified beam 30 or optical element 26. Or the elements 42 can be configured to continuously transition to match the continuous transition of the undesired characteristic in the modified beam. It will be appreciated that the optical element 26 may have a characteristic that is desirable for one aspect, such as a curvature for focusing the beam, and another characteristic (or the same characteristic) that is undesirable for another aspect, such as the curvature rotating the polarization state of the beam. Thus, the elements 42 can be configured to correspond to the undesired characteristic of the optical element, such as the curvature, and to compensate for the undesirable characteristic of the optical element.

It will also be appreciated that the optical element 26 can be disposed in an unpolarized light beam, i.e. without the polarizer 22, and the wire-grid polarizer 38 can both polarize the modified beam 30 from the optical element 26, and correct or compensate as described above.

Referring to FIG. 2, another optical train 10b and method are shown for obtaining a visible light beam with a desired characteristic, and/or for correcting or compensating an undesired optical effect applied by an optical element. The optical train 10b and method are similar in many respects to the optical train and method described above. Thus, much of the description will not be repeated to limit redundancy, but it is understood that the above description with respect to FIG. 1 applies to the present description with respect to FIG. 2. The optical train 10b, however, can include the wire-grid polarizer 38 in accordance with the present invention disposed prior to the optical element 26 to compensate or correct for an undesired optical effect that the optical element is capable of applying. Thus, the wire-grid polarizer 38 can compensate for the undesired optic effect before the optical element undesirably modifies the beam, or so that the modified beam has the desired characteristics after the optical element undesirably modifies the beam. The wire-grid polarizer 38 can be disposed in the visible light beam 18b, which can be unpolarized, indicated by u. The wire-grid polarizer 38 can polarize the visible light beam 18b, i.e. separate the visible light beam into two different light beams, a reflected beam 54 and a transmitted beam 58, with corresponding different polarization states x and y. (As described above, polarization states x and y can be s and p, or p and s, polarizations respectively).

The reflected and/or transmitted beams 54 and 58 can be substantially polarized (or can have substantially a uniform linear polarization state), and can transition continuously from a primary polarization state x or y respectively to a different polarization state x' or y' respectively. For example, the reflected beam 54 can have a substantially uniform polarization state x, but can have at least a portion 54b that transitions continuously from polarization state x to a different polarization state x'. Similarly, the transmitted beam 58 can have a substantially uniform polarization state y, but can have at least a portion 58b that transitions continuously from polarization state y to a different polarization state y'. The different polarization state x' and/or y' can transition to a rotated or elliptical polarization state (or change in magnitude or degree), or can transition to the opposite polarization state y or x respectively. Alternatively, rather than having a substantial polarization state, a substantial portion of the beam can transition from one polarization state to another.

As described above, the transition in polarization state of the reflected or transmitted beams 54 or 58 from the wire-grid polarizer 38 can be positioned to correspond to the undesired characteristic of the optical element 26. Thus, the transition in polarization state can compensate for the undesired characteristic of the optical element 26 so that the modified beam 30 has a desired characteristic, such as a substantially uniform polarization state x or y. Therefore, the wire-grid polarizer 38 can both polarize the visible light beam 18b, and correct or compensate for the optical element 26.

The optical element 26 can be disposed in the transmitted beam 58 and subsequent to the wire-grid polarizer 38, as shown in solid lines. Alternatively, the optical element 26 can be disposed in the reflected beam 54 and subsequent to the wire-grid polarizer 38, as shown in dashed lines. In addition, the optical element 26 can be configured to transmit a modified beam 30. Thus, the modified beam 30 can be the desired beam as corrected or compensated for by the wire-grid polarizer.

As described above with respect to FIG. 5, without the wire-grid polarizer 38, the optical element 26 would undesirably modify the beam.

Referring to FIG. 3, another optical train 10c and method are shown for obtaining a visible light beam with a desired characteristic, and/or for correcting or compensating an undesired optical effect applied by an optical element. The optical train 10c and method are similar in many respects to the optical trains and methods described above. Thus, much of the description will not be repeated to limit redundancy, but it is understood that the above descriptions with respect to FIGS. 1 and 2 apply to the present description with respect to FIG. 3. The optical train 10c, however, can include a different type of optical element 62 disposed in the visible light beam 18. The optical element 62 can be a transmissive or reflective light valve or liquid crystal array that can transmit or reflect portions of light with a specified polarization state, and can selectively rotate the polarization state of specified portions of the beam. In the case of a transmissive light valve or liquid crystal array, the optical element 62 can transmit a modified beam 66 encoded with image information, or portions with different polarization states x or y selectively patterned. Thus, the modified beam 66 may substantially include desired characteristics, such as the desired image information. Alternatively, in the case of a reflective light valve or liquid crystal array, the optical element 62 can reflect a modified beam 70, shown in dashed lines, encoded with image information. The reflective light valve or liquid crystal array is one example of a reflective optical element. Other reflective optical elements can include a planar or flat mirror, a convex mirror, a concave mirror, etc.

In addition, the optical element 62 can undesirably modify the visible light beam 18, or portion thereof, to obtain an undesirable modified beam, indicated by lines 74, with an undesired characteristic. For example, the undesirable modified beam 74 can include an undesired rotated or elliptical polarization, indicated by o. (Alternatively, the optical element can be capable of introducing the undesired characteristic.) The undesired characteristic can continuously transition across at least a portion of the modified beam 66 or 70, indicated by the variable length of the lines 74. For example, the optical element 62 may introduce an undesired rotated or elliptical polarization state o that transitions from lesser to greater, or increases in magnitude, across a cross-section of the beam. An example is represented in FIG. 6 in which a typical polarizer 35, such as a wire-grid polarizer with straight and constant elements, is disposed prior to the optical element 62. The intended purpose of the polarizer 35 can be to provide the optical element 62 with polarized light, while the intended purpose of the optical element 62 can be to provide a correct image, or correct pattern of polarization states. For example, the optical element 62 can be intended to transmit a transmitted beam 64, or reflect a reflected beam 65, with a pattern of orthogonal polarization states x and y. Because the optical element 62 has introduced an undesirable characteristic o into a portion of the beam 64b or 65b, however, the intended purpose of the optical element 62 is not fully realized. For example, the portion of the beam 64b or 65b with the undesirable characteristic o may untreated or mistreated by a subsequent analyzer (or polarizer), and thus be unintentionally eliminated, unintentionally transmitted, unintentionally reflected, etc., resulting in an incorrect or incomplete image.

Therefore, referring again to FIG. 3, a wire-grid polarizer 38 in accordance with the present invention can be disposed in the optical train, or in the modified beam 30 subsequent to the optical element 62 to compensate for the undesired characteristic, or the undesired change in polarization state, of the modified beam 30. The wire-grid polarizer 38 can be disposed in the transmitted beam 66 that is transmitted or passed through the optical element 62, as shown in solid lines. Alternatively, the wire-grid polarizer 38 can be disposed in the reflected beam 70 that is reflected from the optical element 62, as shown in dashed lines. The wire-grid polarizer 38 can substantially separate the beam from the optical element 62, either the transmitted or reflected beam 66 or 70, into opposite or orthogonal polarization states x and y, and can be configured to transmit the desired beam 78 or reflect the desired beam 82.

Referring to FIG. 4, another optical train 10d and method are shown for obtaining a visible light beam with a desired characteristic, and/or for correcting or compensating an undesired optical effect applied by an optical element. The optical train 10d and method are similar in many respects to the optical trains and methods described above. Thus, much of the description will not be repeated to limit redundancy, but it is understood that the above descriptions with respect to FIGS. 1-3 apply to the present description with respect to FIG. 4. The optical train 10d, however, can include the wire-grid polarizer 38 in accordance with the present invention disposed prior to the optical element 62 to compensate or correct for an undesired optical effect that the optical element is capable of applying. The wire-grid polarizer 38 can be disposed in the visible light beam 18b, which can be unpolarized, indicated by u. The wire-grid polarizer 38 can polarize the visible light beam 18b, i.e. separate the visible light beam into two different light beams, a reflected beam 54 and a transmitted beam 58, with corresponding different polarization states x and y. (As described above, polarization states x and y can be s and p, or p and s, polarizations respectively).

The reflected and/or transmitted beams 54 and 58 can be substantially polarized (or can have a substantially uniform linear polarization state), and can transition continuously from a primary polarization state x or y respectively to a different polarization state x' or y' respectively. For example, the reflected beam 54 can have a substantially uniform polarization state x, but can have at least a portion 54b that transitions continuously from polarization state x to a different polarization state x'. Similarly, the transmitted beam 58 can have a substantially uniform polarization state y, but can have at least a portion 58b that transitions continuously from polarization state y to a different polarization state y'. The different polarization state x' and/or y' can transition to a rotated or elliptical polarization state (or change in magnitude or degree), or can transition to the opposite polarization state y or x respectively. Alternatively, rather than having a substantially uniform polarization state, a substantial portion of the beam can transition from one polarization state to another.

As described above, the transition in polarization state of the reflected or transmitted beams 54 or 58 from the wire-grid polarizer 38 can be positioned to correspond to the undesired characteristic of the optical element 62. Thus, the transition in polarization state can compensate for the undesired characteristic of the optical element 62 so that the modified beam 66 or 70 has a desired characteristic, such as a substantially uniform polarization state x or y. Therefore, the wire-grid polarizer 38 can both polarize the visible light beam 18*b*, and correct or compensate for the optical element 62.

The optical element 62 can be disposed in the transmitted beam 58 and subsequent to the wire-grid polarizer 38, as shown in solid lines. Alternatively, the optical element 26 can be disposed in the reflected beam 54 and subsequent to the wire-grid polarizer 38, as shown in dashed lines. In addition, the optical element 62 can be configured to transmit a modified beam 66 or to reflect a modified beam 70.

As described above, the optical element 62 can be a transmissive or reflective light valve or liquid crystal array that can transmit or reflect portions of light with a specified polarization state, and can selectively rotate the polarization state of specified portions of the beam. Thus, the optical element 62 can transmit a modified beam 66 or reflect a modified beam 70 encoded with image information, or portions with different polarization states x or y. Thus, the modified beam 66 or 70 may substantially include desired characteristics, such as the desired image information. The reflective light valve or liquid crystal array is one example of a reflective optical element. Other reflective optical elements can include a planar or flat mirror, a convex mirror, a concave mirror, etc.

As described above, the wire-grid polarizer 38 has a plurality of elongated elements 42 that can interact with the visible light to substantially separate the light into opposite or orthogonal polarization states x and y. (As described above, polarization states x and y can be s and p, or p and s, polarizations respectively).

Specifically, the elements 42 are sized and spaced to interact with visible light. Thus, the elements 42 are relatively long and thin, and disposed in a substantially parallel array, or various portions have parallel arrays. The dimensions are determined by the wavelength used. The following dimensions are believed to be preferable for full spectrum visible light. The elements preferably have a length larger than the wavelength of visible light, or greater than 700 nm (0.7 µm). The length, however, can be much longer. In one aspect, the elements have a center-to-center spacing, pitch or period less than the wavelength of visible light, or less than 400 nm (0.4 µm). In another aspect, the elements have a pitch or period less than half the wavelength of visible light, or less than 200 nm (0.2 µm). In another aspect, the elements have a width in the range of 10 to 90% of the pitch or period.

The elements 42 generally interact with the visible light to generally 1) transmit a transmitted beam having a substantially uniform and constant linear polarization state, and 2) reflect a reflected beam also have a substantially uniform and constant linear polarization state. The elements generally transmit light with a first polarization state, oriented locally orthogonal or transverse to the elements, and reflect light with a second polarization state, oriented parallel to the elements. It will be appreciated that the wire-grid polarizer will separate the polarization states of the light with a certain degree of efficiency, or some of both polarization states may be transmitted and/or reflected. It will also be appreciated that a portion of the elements will be configured to transmit or reflect a different polarization state.

In addition, the elements 42 have at least a portion that continuously transitions to a different characteristic that corresponds to the undesired characteristic of the modified beam, or undesirable characteristic of the optical element. As described above, the continuous transition to a different characteristic of the elements 42 of the wire-grid polarizer 38 can include a change to: a different angular orientation; a different period; a different width; a different thickness; a different shape; and/or a curvature or different curvature. All or only some of the elements may transition. In addition, only a portion of the element may transition.

Figure 7A:
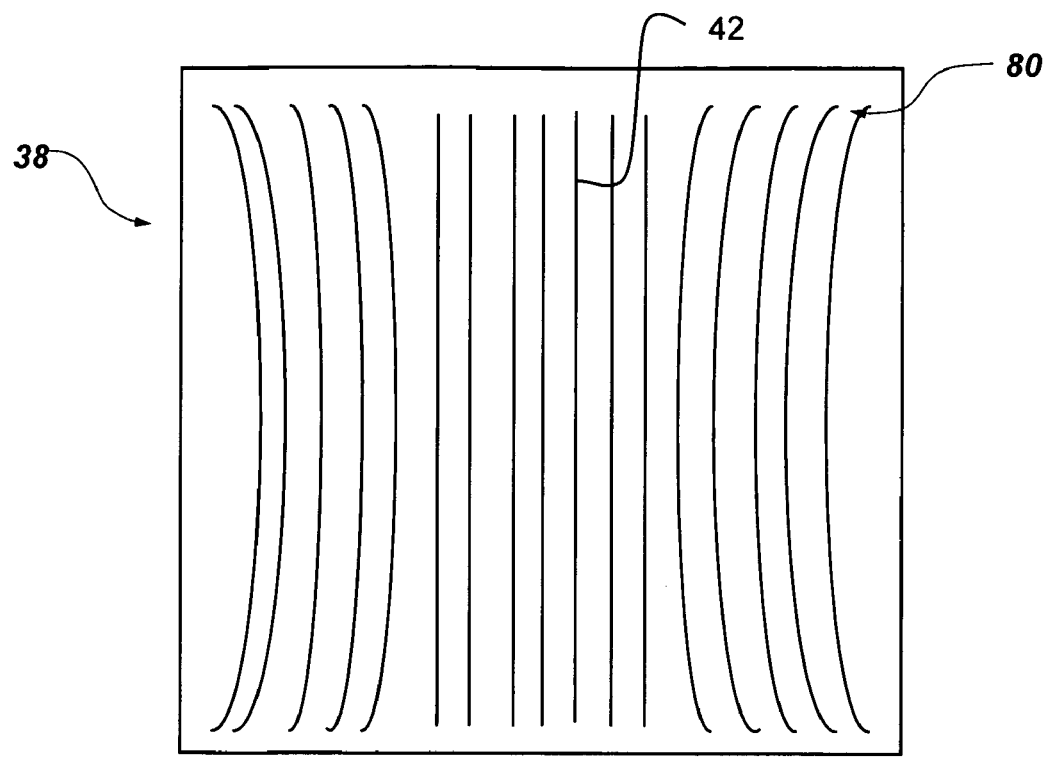
FIGS. 7a and 7b are front schematic views of a wire grid polarizer in accordance with an embodiment of the present invention.
Figure 7B:
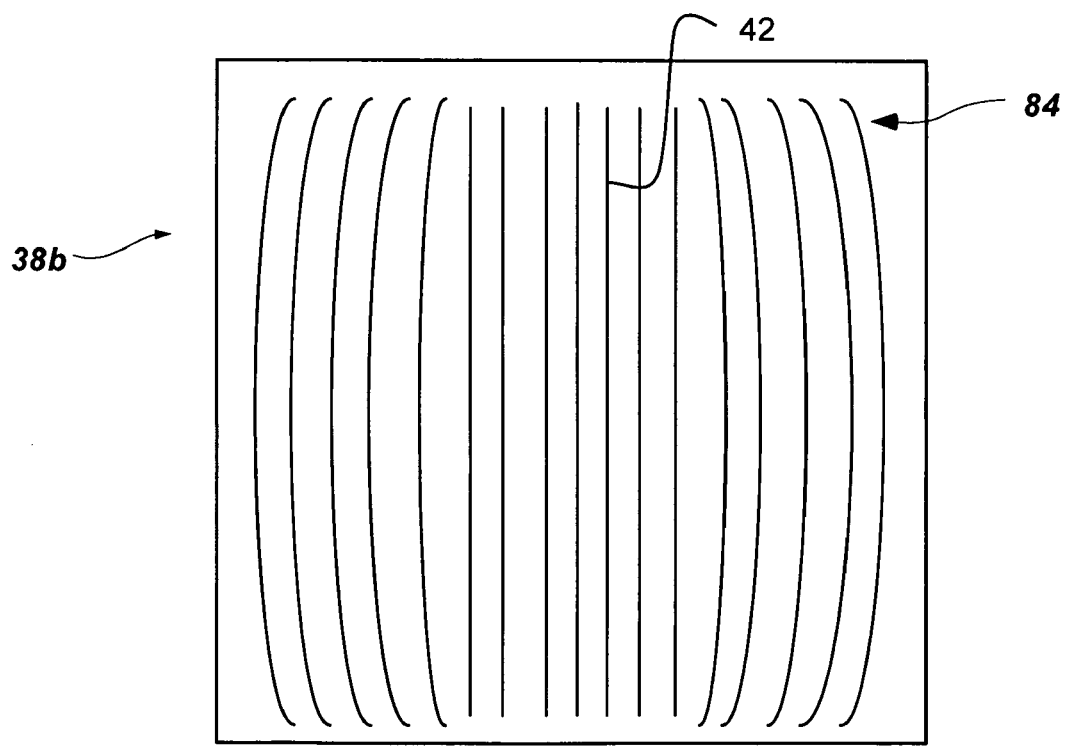

Referring to FIGS. 7*a* and 7*b*, the elements 42, or portions thereof, can include a continuous transition from straight or linear portions, to curved or arcuate portions 80 and 84 with a curvature within a plane of the elements. (FIGS. 7*a* and 7*b* are shown schematically for clarity.) The arcuate portions 80 can be concave, or extend outward, as shown in FIG. 7*a*. Alternatively, the arcuate portions 84 can be convex, or extend inward, as shown in FIG. 7*b*. The curvature can be simple or compound. The wire-grid polarizers 38 and 38*b* can have the arcuate portions 80 and 84 positioned near the corners so that the elements 42 transition from straight or linear at the center, top, bottom and sides, to arcuate portions 80 and 84 near the corners. Thus, a majority of the element 42 can be relatively straight and parallel with respect to one another, with the arcuate portions 80 and 84 having a curvature with respect to the straight elements. The elements 42, 80 and 84 in FIGS. 7*a* and 7*b* can be configured for use with square optical element that tends to introduce aberrations at its corners. The magnitude, shape, orientation and position of the curvature are determined by the type and location of the aberration being corrected.

Figure 8:
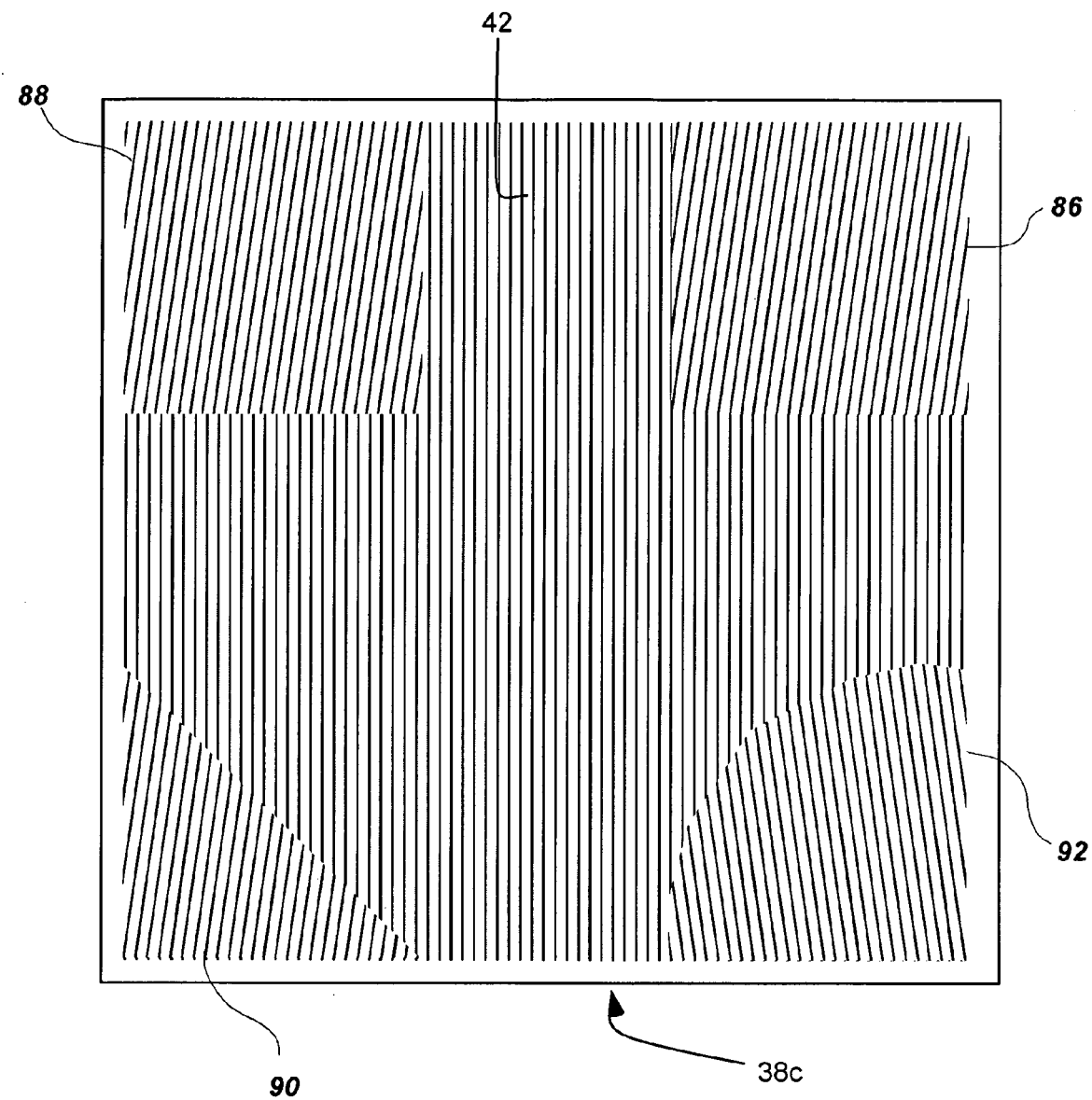
FIG. 8 is a front schematic view of a wire grid polarizer in accordance with an embodiment of the present invention.

Referring to FIG. 8, the wire-grid polarizer 38*c* can have elements 42 with a continuous transition from straight or linear portions to different straight or linear portions with a different angular orientation than the remaining elements 42. (The wire-grid polarizer of FIG. 8 is shown schematically for clarity, and represents several different variations.) For example, some elements and/or portions 86 of the elements can be straight or linear, but have an angular orientation that extends outward. Similarly, some elements and/or portions 88 of the elements can extend inward. The angle of angular portions 86 and 88 can be obtuse with respect to the remaining elements 42. In addition, the angular portions 88 or 92 can be parallel with respect to one another, but have an obtuse angle with respect to the other elements. Thus, a majority of the elements 42 can be relatively straight and parallel with respect to one another, but with the angular portions 86 and 88 having an obtuse angle with respect to the other elements 42. Again, the angular element 86 and 88 can be positioned at the distal corners of the wire-grid polarizer. Thus, the wire-grid polarizer 38*c* can have elements 42 that transition from straight or linear at the center, top, bottom and sides, to angular portions 88 and 92 near the corners. It will be appreciated that a single element can transition from one angular orientation to another, or that a second element can have a different angular orientation. The angular portion 86 and 88 and the remaining elements 42 can define a transition, or a point or line, where the elements 42 change to the different angular portion 86 and 88. The transition can be straight or linear, and can be oriented orthogonal and parallel with respect to the elements 42. Alternatively, other angular portions 90 can form a straight or linear transition that is oriented at an acute angle with respect to both the elements, such as at 45 degrees. Other angular portions 92 can form a curvilinear or arcuate transition. The elements or wire-grid polarizer can be configured for use with a square optical element that tends to introduce aberrations at its corners. The angle, shape of the transition, orientation of the transition and position of the transition are determined by the type and location of the aberration being corrected.

Figure 9:
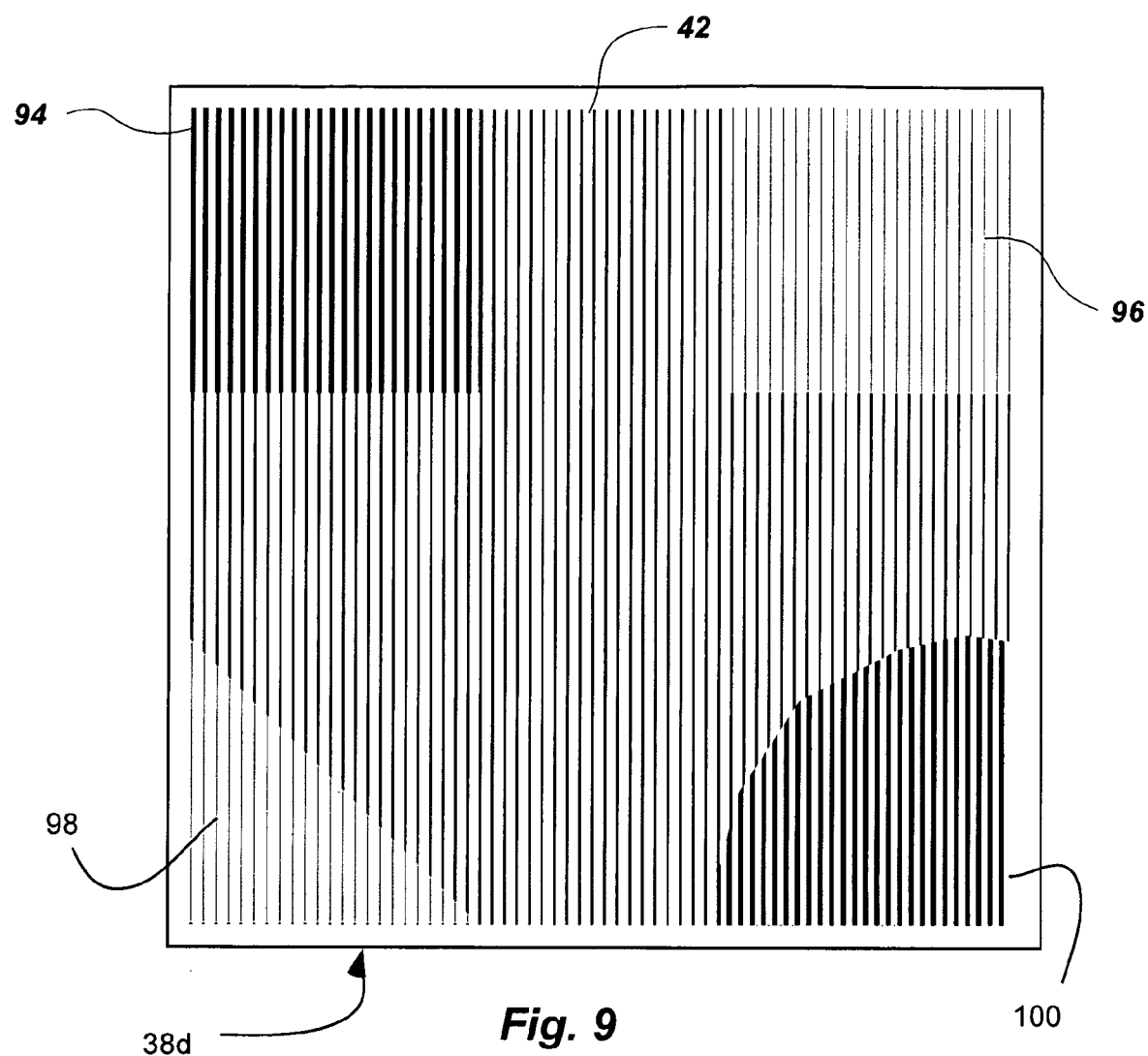
FIG. 9 is a front schematic view of a wire grid polarizer in accordance with an embodiment of the present invention.

Referring to FIG. 9, the wire-grid polarizer 38*d* can have elements or portions thereof with a continuous transition to different widths, and/or different spacing. (The wire-grid polarizer of FIG. 9 is shown schematically for clarity, and represents several different variations.) A majority of the elements 42 can have a constant and/or uniform thickness, such as at the center, top, bottom and sides, with the portions 94 and 96 having different widths. Some of the elements or portions 94 can be wider with narrower spacing or gaps, and/or some of the elements or portions 96 can by narrower with wider spacing or gaps. The elements can transition from one width to a different width. The transition can be straight or linear as described above, and oriented perpendicular and parallel with the elements. Other portions 98 can have a transition oriented at an acute angle, such as 45 degrees. Other angular portions 100 can form a curvilinear or arcuate transition. The elements or wire-grid polarizer can be configured for use with a square optical element that tends to introduce aberrations at its corners. The width, spacing, orientation of the transition and position of the transition are determined by the type and location of the aberration being corrected.

Figure 10:
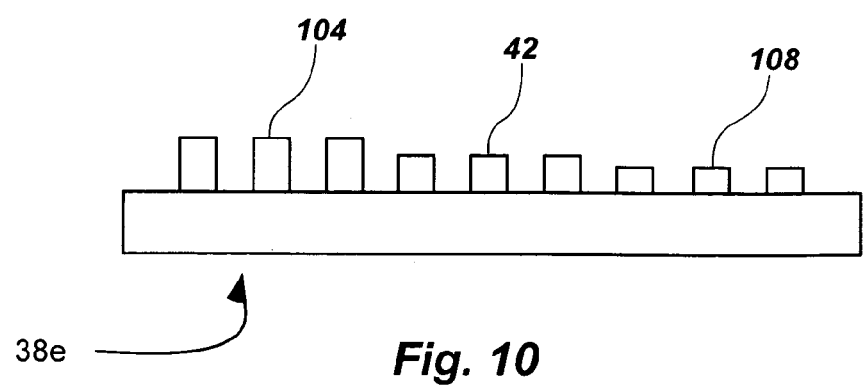
FIG. 10 is a side schematic view of a wire grid polarizer in accordance with an embodiment of the present invention.

Referring to FIG. 10, the wire-grid polarizer 38e can have elements or portion 104 and 108 that transition to different thicknesses. For example, a majority of the elements 42 can have a constant and/or uniform thickness, such as at the center, top, bottom and sides, but transitioning to thicker and thinner portions 104 and 108 along the length of the elements. The position of the thicker and thinner portions is determined by the type and location of aberration being corrected. As described above, the elements can transition in various different patterns to thicker or thinner.

Figure 11A:
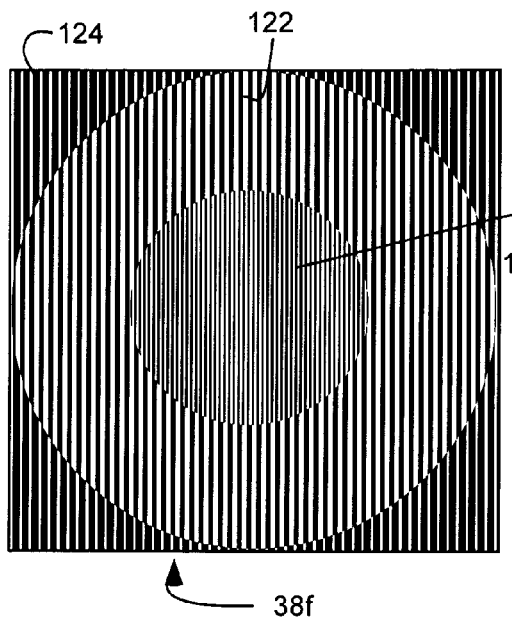
FIGS. 11a-11d are front schematic views of wire grid polarizers in accordance with an embodiment of the present invention.
Figure 11B:
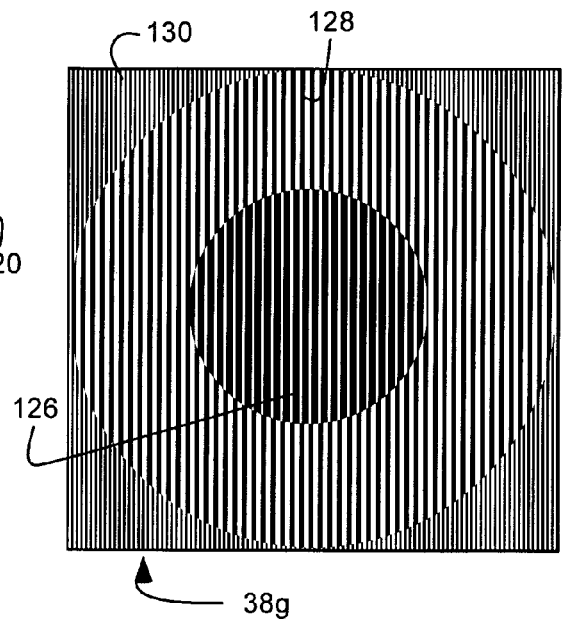
Figure 11C:
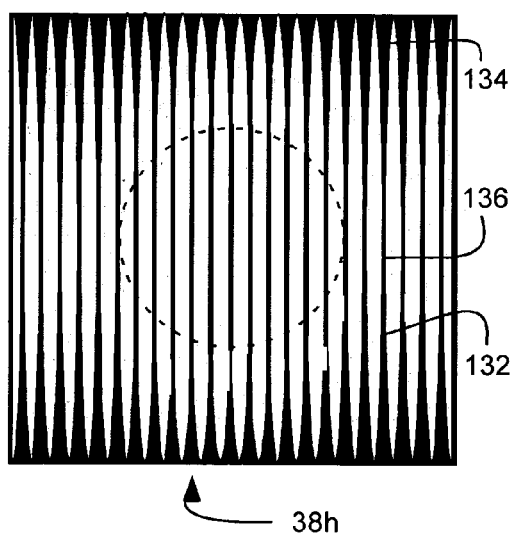
Figure 11D:
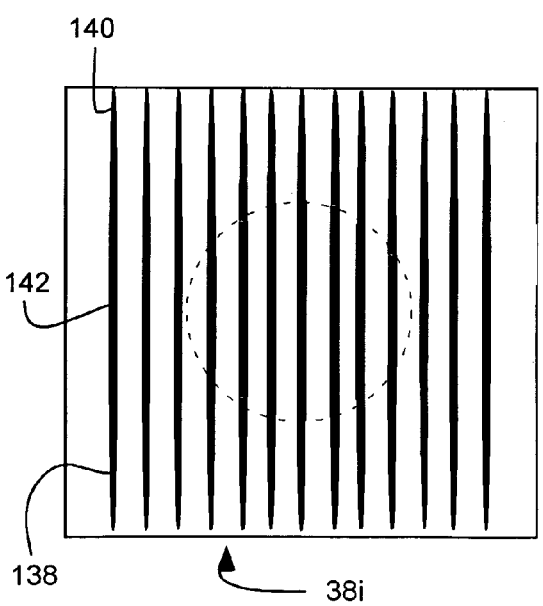

The wire-grid polarizers can have elements with a characteristic that transition in a pattern. Referring to FIGS. 11a and 11b, the wire-grid polarizer 38f and 38g can have elements with widths that transition from one width to another in a pattern of concentric circles or concentric annular regions. Thus, the patterns can be discrete. For example, the elements 120-124 can transition from a narrower width in a center, to a wider width around a perimeter, as shown in FIG. 11a. As another example, the elements 126-130 can transition from a wider width in a center, to a narrower width around a perimeter, as shown in FIG. 11b. Such concentric patterns can be useful for correcting circular optical elements. It will be appreciated that numerous concentric patterns can be provided. In addition, the elements can transition continually along the length of the element. For example, the wire-grid polarizer 38h can have elements 132 that can increase in width at their distal ends 134 (and decreased width in the middle or intermediate portion 136), and form a circular pattern, indicated by the dashed line, as shown in FIG. 11c. As another example, the wire-grid polarizer 38i can have elements 138 that can decrease in width at their distal ends 140 (and increased width in the middle or intermediate portion 142), and form a circular pattern, indicated by the dashed line, as shown in FIG. 1d.

Figure 12A:
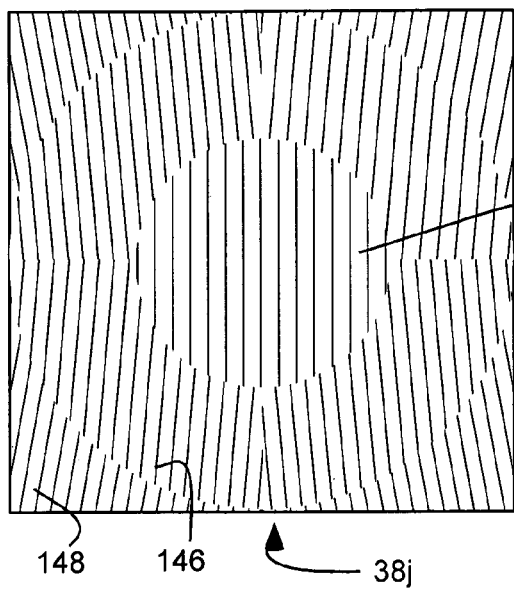
FIGS. 12a-12d are front schematic views of wire grid polarizers in accordance with embodiments of the present invention.
Figure 12B:
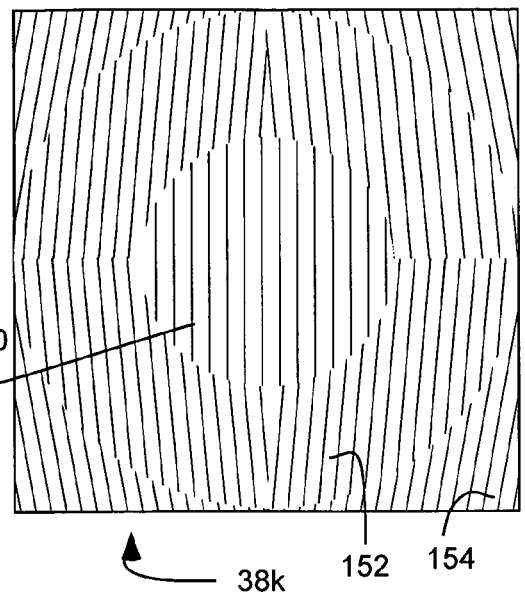
Figure 12C:
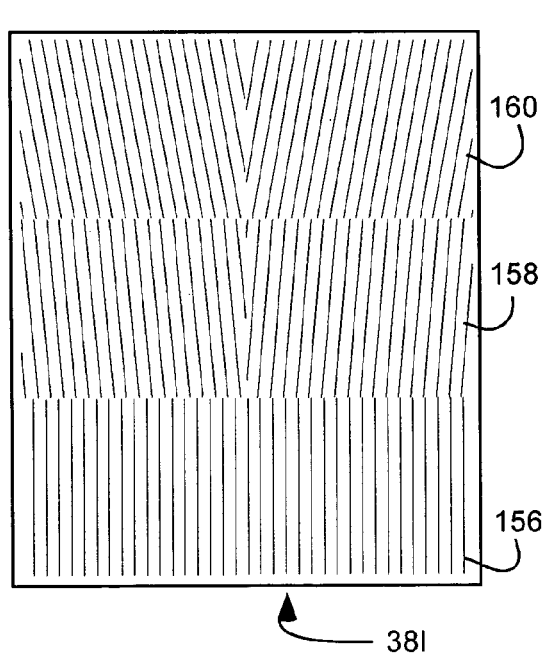
Figure 12D:
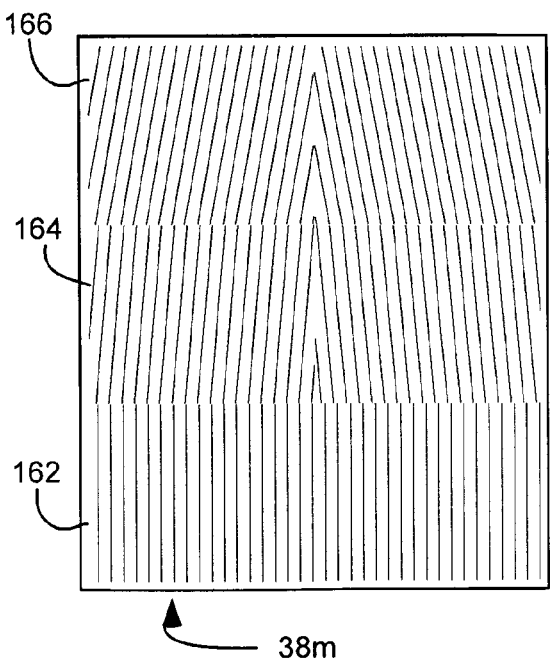

Referring to FIGS. 12a and 12b, the wire-grid polarizer 38j and 38k can have elements with angular orientations that transition from one angle to another in a pattern of concentric circles, or concentric annular regions. Again, these regions or concentric circles can be discrete. For example, the elements 144-148 can transition in angle from the center, to greater obtuse angles extending outwardly, as shown in FIG. 12a. As another example, the elements 150-154 can extend inwardly, as shown in FIG. 12b. As another example, the wire-grid polarizer 38l and 38m can have elements 156-160 and 162-166 that can be formed in adjacent sequential regions progressing along the length of the elements, with the elements in adjacent groups increasing or decreasing in relative angular orientation, as shown in FIGS. 12c and 12d.

Figure 13A:
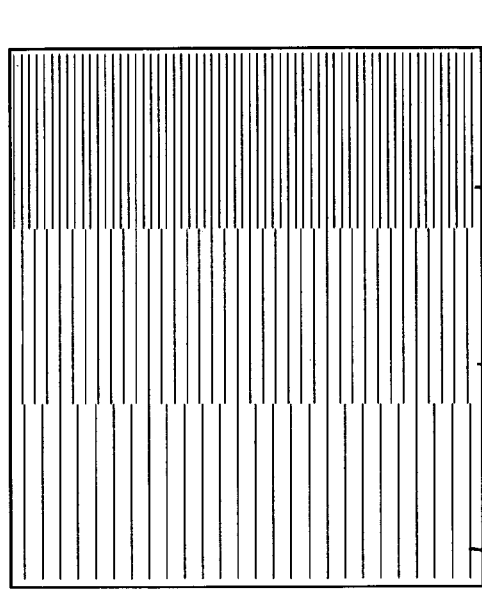
FIGS. 13a-13d are front schematic views of wire grid polarizers in accordance with an embodiment of the present invention.
Figure 13B:
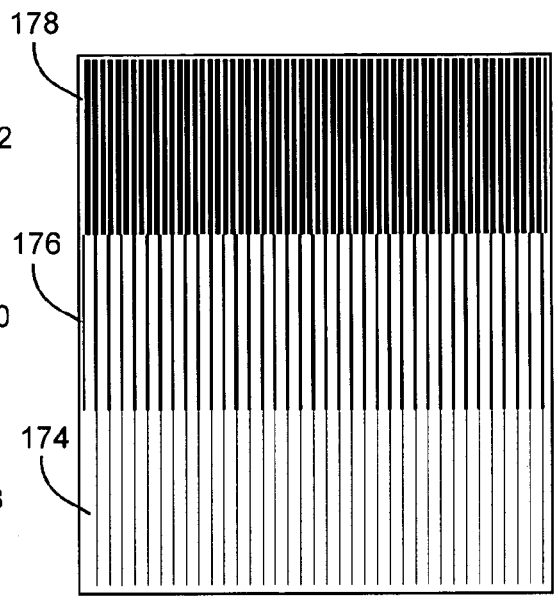
Figure 13C:
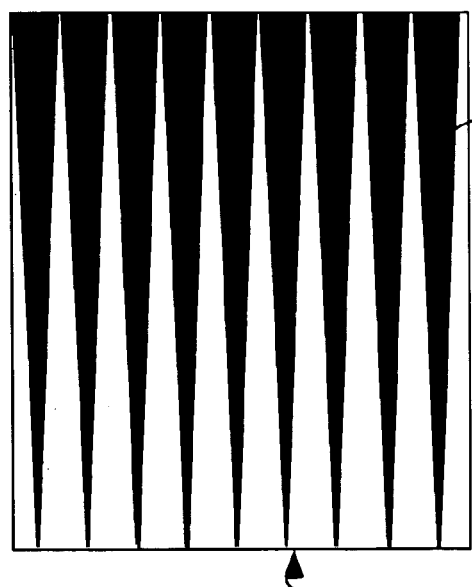
Figure 13D:
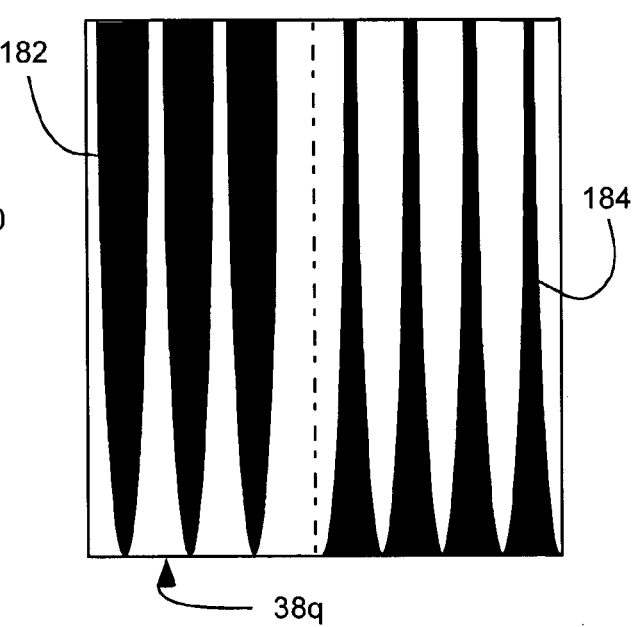

Referring to FIG. 13a, the wire-grid polarizer 38n can have elements 168-172 that transition from one period or spacing to another in adjacent zones or regions. For example, the elements can have elongated regions perpendicular to the elements with the pitch in each region increasing or decreasing by adjacent region. Referring to FIG. 13b, the wire-grid polarizer 38o can have elements 174-178 that transition from one width to another in adjacent zones or regions. For example, the elements can have elongated regions perpendicular to the elements with the width in each region increasing or decreasing by adjacent region. As another example, the wire-grid polarizer 38p can have elements 180 that can increase and/or decrease in width along their length in a linear fashion, as shown in FIG. 13c. As another example, the wire-grid polarizer 38q can have elements 182 or 184 that can increase and/or decrease in width along their length in a curved or arcuate fashion, as shown in FIG. 13d.

It is understood that the transition in characteristics of the elements can include one or more of the above characteristics. For example, the elements can transition from straight to curved and thicker, etc. In addition, the elements can transition in thickness along their length. For example, a middle or intermediate portion of an element can be relatively thin, while its distal ends can be relatively thick. Alternatively, the middle of the element can be relatively thick while the distal ends are relatively thin.

Figure 14:
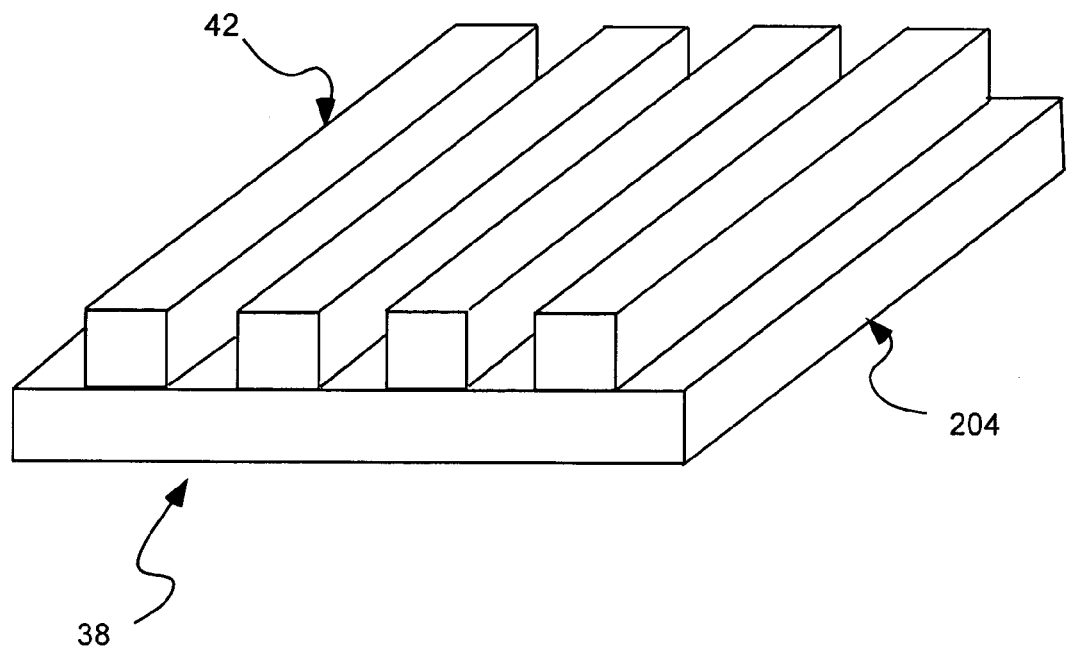
FIG. 14 is a schematic perspective view of a wire grid polarizer in accordance with an embodiment of the present invention.
Figure 15:
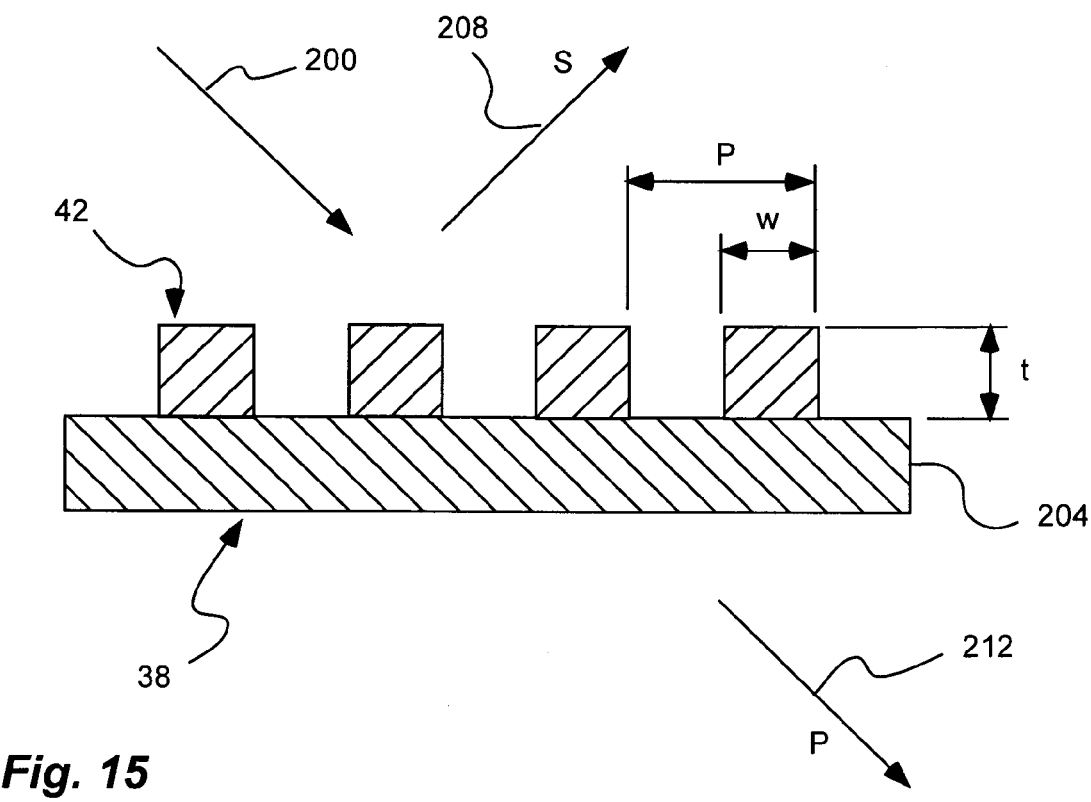
FIG. 15 is a schematic cross-sectional end view of the wire grid polarizer of FIG. 14.

Referring to FIGS. 14 and 15, a representative wire-grid polarizer 38 is shown generally decoupling two orthogonal polarizations of a beam of electromagnetic waves 200. The beam 200 can be incident on the face of the polarizer 38, or on the elements, as shown, particularly in the case of an image or information bearing beam. Alternatively, the beam can be incident on the substrate. The wire-grid polarizer 38 can include a plurality of elongated, spaced-apart elements 42 disposed on a substrate 204. The elements 42 can be disposed on the substrate 402, such as by photo-lithography. The elements 42 can be conductive elements or wires, and can be formed of aluminum or silver, which have been found to be effective. The substrate can be glass, plastic or quartz or the like. The substrate 204 can be transparent to the electromagnetic waves or visible light so that the electromagnetic waves or light can be transmitted by, or pass through, the substrate. Thus, the substrate 204 can have an optical property of transmitting the electromagnetic waves or visible light. In one aspect, the optical element 26 or substrate 204 can transmit the electromagnetic waves or light without otherwise altering it, such as, without changing the phase, angle, etc. It will be appreciated that other structures, materials, or layers can be disposed between the elements 42 and the substrate 204, including for example, ribs, gaps, grooves, layers, films, etc. In addition, a region can be formed between the elements and the substrate with a low refractive index (or a refractive index lower than a refractive index of the substrate), and a controlled thickness. The low index region separating the elements from the substrate can shift the longest wavelength resonance point to a shorter wavelength, and can reduce the fraction of P polarized electromagnetic waves or light that is reflected from the polarizer.

The elements 42 are relatively long and thin. All or most of the elements 42 can have a length that is generally larger than the wavelength of desired electromagnetic waves, such as visible light. Thus, the elements 42 have a length of at least approximately 0.7 µm (micrometers or microns) for visible light applications. The typical length, however, may be much larger. The elements 42 can have a thickness or a height t less than the wavelength of the desired electromagnetic waves or light, or less than 0.4 µm (micrometers or microns) for visible light applications. In one aspect, the thickness can be less than 0.2 µm for visible light applications. In addition, the elements 42 are located in generally parallel arrangement with a spacing, pitch, or period P of the elements being smaller than the wavelength of the desired electromagnetic waves or light. Thus, the elements 42 have a pitch P of less than 0.4 µm (micrometers or microns) for visible light applications. In one aspect, the pitch P can be approximately one-half the wavelength of light, or approximately 0.2 µm for visible light applications. The elements 42 also can have a width w less than the period P, or less than 0.4 µm or 0.2 µm for visible light applications. In one aspect, the width can be less than 0.1-0.2 µm for visible light applications. It should be noted that arrays with longer periods (greater than approximately twice the wavelength of light or 1.4 µm) can operate as diffraction gratings, while arrays with shorter periods (less than approximately half the wavelength of light or 0.2 µm) operate as polarizers, while arrays with periods in a transition region (between approximately 0.2 and 1.4 µm) also act as diffraction gratings and are characterized by abrupt changes or anomalies referred to as resonances. Thus, it will be appreciated that the actual size of the elements 42 is quite small, and the array of elements 42 can actually appear as a continuous, reflective surface to the unaided eye. As shown in the figures, however, the array of elements 42 actually creates a very small structure, or nano-structure with a size or scale on the order of $10^{-8}$ meters.

In addition, the size and configuration of the array of elements 42 is designed to interact with the electromagnetic waves or visible light to generally transmit electromagnetic waves of one polarization, and generally reflect electromagnetic waves of another polarization. As stated above, a beam 200 can be incident on the polarizer 38. The polarizer device 38 can divide the beam 200 into a specularly reflected component 208, and a non-diffracted, transmitted component 212. Using the normal definitions for S and P polarization, the wave or light with S polarization has the polarization vector orthogonal to the plane of incidence, and thus parallel to the conductive elements. Conversely, wave or light with P polarization has the polarization vector parallel to the plane of incidence and thus orthogonal to the conductive elements.

In general, the polarizer 38 can reflect waves or light with its electric field vector parallel to the elements 42 (or the S polarization), and transmit waves or light with its electric field vector perpendicular to the elements (or the P polarization). Ideally, the polarizer can function as a perfect mirror for one polarization of waves or light, such as the S polarized light, and can be perfectly transparent for the other polarization, such as the P polarized light. In practice, however, even the most reflective metals used as mirrors absorb some fraction of the incident light and reflect only 90% to 95%, and plain glass does not transmit 100% of the incident light due to surface reflections.

Various aspects of wire-grid polarizers, optical trains and/or projection/display systems are shown in U.S. Pat. Nos. 5,986,730; 6,081,376; 6,122,103; 6,208,463; 6,243,199; 6,288,840; 6,348,995; 6,108,131; 6,452,724; 6,710,921; 6,234,634; 6,447,120; and 6,666,556, which are herein incorporated by reference.

Although the wire-grid polarizers have been illustrated as facing the light source, or with the elongated elements facing towards the light source, it is understood that this is for illustrational purposes only. Those skilled in the art will appreciate that the wire-grid polarizers can be oriented to face towards imaging bearing beams, such as from a liquid crystal array, for the simple purpose of avoiding passing the image bearing beam through the substrate, and thus avoiding ghost images or multiple reflections associated with light passing through mediums. Such configurations may result in the wire-grid polarizer facing away from the light source.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A method for obtaining a visible light beam with a desired characteristic, comprising the steps of:
   a) providing a visible light beam;
   b) modifying the visible light beam with an optical element to obtain a modified beam, the optical element being capable of introducing an undesired characteristic that continuously transitions across at least a portion of the modified beam; and
   c) compensating for the undesired characteristic of the modified beam with a wire-grid polarizer having a plurality of elongated elements with at least a portion that continuously transitions to a different characteristic corresponding to the undesired characteristic of the modified beam to obtain a visible light beam with a desired characteristic substantially across the visible light beam.

2. A method in accordance with claim 1, wherein the step of modifying further includes modifying the visible light beam with an optical element having an undesirable characteristic; and wherein the step of compensating further includes compensating for the undesirable characteristic of the optical element.

3. A method in accordance with claim 1, wherein the undesired characteristic of the modified beam includes an undesirable, continuous transition in polarization state; and wherein the plurality of elongated elements have at least a portion that continuously transitions to a different characteristic corresponding to the undesirable, continuous transition in polarization state of the modified beam to obtain a visible light beam with a substantially uniform polarization state.

4. A method in accordance with claim 1, wherein the step of compensating further comprises the step of disposing a wire-grid polarizer with a plurality of elongated elements that continuously transition to a different characteristic selected from the group consisting of:
   a different angular orientation;
   a different period;
   a different width;
   a different thickness;
   a different shape; and
   a curvature.

5. A method in accordance with claim 1, wherein the step of modifying further comprises the step of disposing an optical element in the visible light beam, the optical element being selected from the group consisting of:

a lens;
a transmissive liquid crystal array;
a reflective liquid crystal array;
an optical retarder;
a waveplate;
a prism;
a substrate;
a mirror;
a concave mirror;
a convex mirror; and
a polarizer.

6. A method in accordance with claim 1, wherein the step of compensating further comprises the step of disposing the wire-grid polarizer in the visible light beam prior to the optical element.

7. A method in accordance with claim 1, wherein the step of compensating further comprises the step of disposing the wire-grid polarizer in the modified light beam subsequent to the optical element.

8. A method in accordance with claim 1, wherein the visible light beam is transmitted through the optical element.

9. A method in accordance with claim 1, wherein the visible light beam is reflected from the optical element.

10. A method in accordance with claim 1, wherein a compensating beam is transmitted through the wire-grid polarizer.

11. A method in accordance with claim 1, wherein a compensating beam is reflected from the wire-grid polarizer.

12. A method in accordance with claim 1, wherein the plurality of elongated elements of the wire-grid polarizer have a period less than a wavelength of visible light and a length greater than the wavelength of visible light.

13. A method for obtaining a visible light beam with a desired polarization state, comprising the steps of:
   a) providing a visible light beam;
   b) modifying the visible light beam with an optical element to obtain a modified beam, the optical element having an undesirable characteristic capable of introducing an undesirable, continuous transition in polarization state into at least a portion of the modified beam; and
   c) compensating for the undesirable characteristic of the optical element and the undesirable, continuous transition in polarization state of the modified beam with a wire-grid polarizer having a plurality of elongated elements with a period less than a wavelength of visible light and a length greater than the wavelength of visible light, the plurality of elongated elements having at least a portion that continuously transitions to a different characteristic corresponding to the undesirable characteristic of the optical element and the undesirable, continuous transition in polarization state of the modified beam to obtain a visible light beam with a substantially uniform polarization state.

14. A method for obtaining a visible light beam with a desired polarization state, comprising the steps of:
   a) providing a visible light beam;
   b) modifying the visible light beam with an optical element to obtain a modified beam, the optical element having an undesirable characteristic capable of introducing an undesirable polarization into at least a portion of the modified beam; and
   c) compensating for the undesirable characteristic of the optical element and the undesirable polarization of the modified beam with a wire-grid polarizer having a plurality of elongated elements with at least a portion that continuously transitions to a different characteristic corresponding to the undesirable characteristic of the optical element and the undesirable polarization of the modified beam to obtain a visible light beam with a substantially uniform polarization state.

15. A method for treating a beam to compensate for an undesired optical effect applied by an optical element, comprising the steps of:
   a) providing an optical train defined by a beam;
   b) providing an optical element in the optical train, the optical element including a modifying portion capable of undesirably modifying at least a portion of the beam to transition from a desired polarization to a different, undesired polarization;
   c) providing a wire-grid polarizer in the optical train having a plurality of elongated elements with at least a portion that continuously transition to a different characteristic corresponding to the modifying portion of the optical element and the transition from the desired polarization to the different, undesired polarization; and
   d) positioning the wire-grid polarizer so that the continuous transition to a different characteristic corresponds to the transition from the desired polarization to the different, undesired polarization.

16. An optical system configured to provide a visible light beam with a desired characteristic, comprising:
   a) a visible light source producing a visible light beam defining an optical train;
   b) an optical element, disposed in the optical train to create a modified beam, capable of introducing an undesired characteristic that continuously transitions across at least a portion of the modified beam; and
   c) a wire-grid polarizer, disposed in the optical train, having a plurality of elongated elements with at least a portion that continuously transitions to a different characteristic, the wire-grid polarizer being positioned and oriented in the optical train with the different characteristic corresponding to the undesired characteristic of the modified beam to obtain a visible light beam with a desired characteristic substantially across the visible light beam.

17. A system in accordance with claim 16, wherein the optical element has an undesirable characteristic; and wherein the wire-grid polarizer is positioned and oriented with respect to the optical element with the different characteristic corresponding to the undesirable characteristic of the optical element.

18. A system in accordance with claim 16, wherein the undesired characteristic of the modified beam includes an undesirable, continuous transition in polarization state; and wherein the plurality of elongated elements have at least a portion that continuously transitions to a different characteristic corresponding to the undesirable, continuous transition in polarization state of the modified beam to obtain a visible light beam with a substantially uniform polarization state.

19. A system in accordance with claim 16, wherein the different characteristic is selected from the group consisting of:
   a different angular orientation;
   a different period;
   a different width;
   a different thickness;
   a different shape; and
   a curvature.

20. A system in accordance with claim 16, wherein the optical element is selected from the group consisting of:

a lens;
a transmissive liquid crystal array;
a reflective liquid crystal array;
an optical retarder;
a waveplate;
a prism;
a substrate;
a mirror;
a concave mirror;
a convex mirror; and
a polarizer.

21. A system in accordance with claim 16, wherein the wire-grid polarizer is positioned in the optical train prior to the optical element.

22. A system in accordance with claim 16, wherein the wire-grid polarizer is positioned in the optic train subsequent to the optical element.

23. A system in accordance with claim 16, wherein the optical element transmits the visible light beam through the optical element.

24. A system in accordance with claim 16, wherein the optical element reflects the visible light beam from the optical element.

25. A system in accordance with claim 16, wherein the wire-grid polarizer is positioned to transmit a compensating beam.

26. A system in accordance with claim 16, wherein the wire-grid polarizer is positioned to reflect a compensating beam.

27. A system in accordance with claim 16, wherein the plurality of elongated elements of the wire-grid polarizer have a period less than a wavelength of visible light and a length greater than the wavelength of visible light.

28. An optical system configured to provide a visible light beam with a desired polarization state, comprising:
    a) a visible light source producing a visible light beam defining an optical train;
    b) an optical element, disposed in the optical train to create a modified beam, having an undesirable characteristic capable of introducing an undesirable, continuous transition in polarization state into at least a portion of the modified beam; and
    c) a wire-grid polarizer, disposed in the optical train, having a plurality of elongated elements with at least a portion that continuously transitions to a different characteristic, the wire-grid polarizer being positioned and oriented in the optical train with the different characteristic corresponding to the undesirable characteristic of the optical element and the undesirable, continuous transition in polarization state of the modified beam to obtain a visible light beam with a substantially uniform polarization state.

29. An optical system configured to provide a visible light beam with a desired polarization state, comprising:
    a) a visible light source producing a visible light beam defining an optical train;
    b) an optical element, disposed in the optical train to create a modified beam, having an undesirable characteristic capable of introducing an undesirable polarization into at least a portion of the modified beam; and
    c) a wire-grid polarizer, disposed in the optical train, having a plurality of elongated elements with at least a portion that continuously transitions to a different characteristic, the wire-grid polarizer being positioned and oriented in the optical train with the different characteristic corresponding to the undesirable characteristic of the optical element and the undesirable polarization of the modified beam to obtain a visible light beam with a substantially uniform polarization state.

30. An optical system configured to compensate for an undesired optical effect applied by an optical element, comprising the steps of:
    a) a light source producing a beam defining an optical train;
    b) an optical element, disposed in the optical train to create a modified beam, having a modifying portion capable of undesirably modifying at least a portion of the beam to transition from a desired polarization to a different, undesired polarization; and
    c) a wire-grid polarizer, disposed in the optical train, having a plurality of elongated elements with at least a portion that continuously transitions to a different characteristic, the wire-grid polarizer being positioned and oriented in the optical train with the different characteristic corresponding to the modifying portion of the optical element and the transition from the desired polarization to the different, undesired polarization; and
    d) the wire-grid polarizer being positioned so that the continuous transition to a different characteristic corresponds to the transition from the desired polarization to the different, undesired polarization.

* * * * *